United States Patent [19]
Rizkin et al.

[11] Patent Number: 5,629,996
[45] Date of Patent: May 13, 1997

[54] UNIVERSAL REMOTE LIGHTING SYSTEM WITH NONIMAGING TOTAL INTERNAL REFLECTION BEAM TRANSFORMER

[75] Inventors: Alexander Rizkin, Rendondo Beach; Lev S. Sadovnik; Vladimir Manasson, both of Los Angeles, all of Calif.

[73] Assignee: Physical Optics Corporation, Torrance, Calif.

[21] Appl. No.: 636,798

[22] Filed: Apr. 22, 1996

Related U.S. Application Data

[63] Continuation of Ser. No. 564,596, Nov. 29, 1995, abandoned.
[51] Int. Cl.⁶ ............................................. F21V 8/00
[52] U.S. Cl. ..................... 385/31; 359/15; 359/34; 362/32; 385/147; 385/901
[58] Field of Search .................... 362/32; 385/15, 385/31, 33–37, 39, 43, 133, 147, 901; 359/13–15, 34

[56] References Cited

U.S. PATENT DOCUMENTS

| 4,898,450 | 2/1990 | Jannson et al. | 385/50 |
| 5,161,874 | 11/1992 | Benes | 362/32 |
| 5,365,354 | 11/1994 | Jannson et al. | 359/15 |
| 5,436,806 | 7/1995 | Kato | 362/32 |
| 5,440,428 | 8/1995 | Hegg et al. | 359/13 X |
| 5,486,984 | 1/1996 | Miller | 362/32 |

*Primary Examiner*—John D. Lee
*Attorney, Agent, or Firm*—Nilles & Nilles, S.C.

[57] ABSTRACT

Systems and methods for universal remote lighting systems are described. A high definition universal remote lighting system includes a light source that is coupled to a light pipe, a high efficiency nonimaging total internal reflection light transformer design and a high efficiency holographic diffuser for shaping the light. The present invention can also include an optical switch device for direct light output monitoring. The systems and methods provide advantages such as cost reduction, better monitoring and control, maintenance simplification, enhanced personnel safety, electro-magnetic impulse (EMI) insensitivity, reduced radar and weight/size reduction.

25 Claims, 18 Drawing Sheets

321 – GLASS SUBSTRATE
322 – CONDUCTIVE LAYER (ITO)
323 – ALIGNMENT LAYER
324 – LIQUID CRYSTAL $a \sin^2 \theta_2 \leq A \sin^2 \theta_1 =$ LIOUVILLE INVARIANT $d \sin^2 \theta_1 = D \sin^2 \theta_2$ DT GREEN
- T ≤ 1% abs.    400-480 nm
- T = 50%         515 ± 7.5 nm
- T ≥ 90% avg.   530-555 nm
- T ≥ 85% abs.   530-555 nm
- T = 50%         570 ± 7.5 nm
- T ≤ 1% abs.    600-750 nm DT RED
- T ≤ 1% abs.    400-570 nm
- T = 50%         600 ± 10 nm
- T ≥ 90% avg.   630-760 nm
- T ≥ 85% abs.   630-760 nm

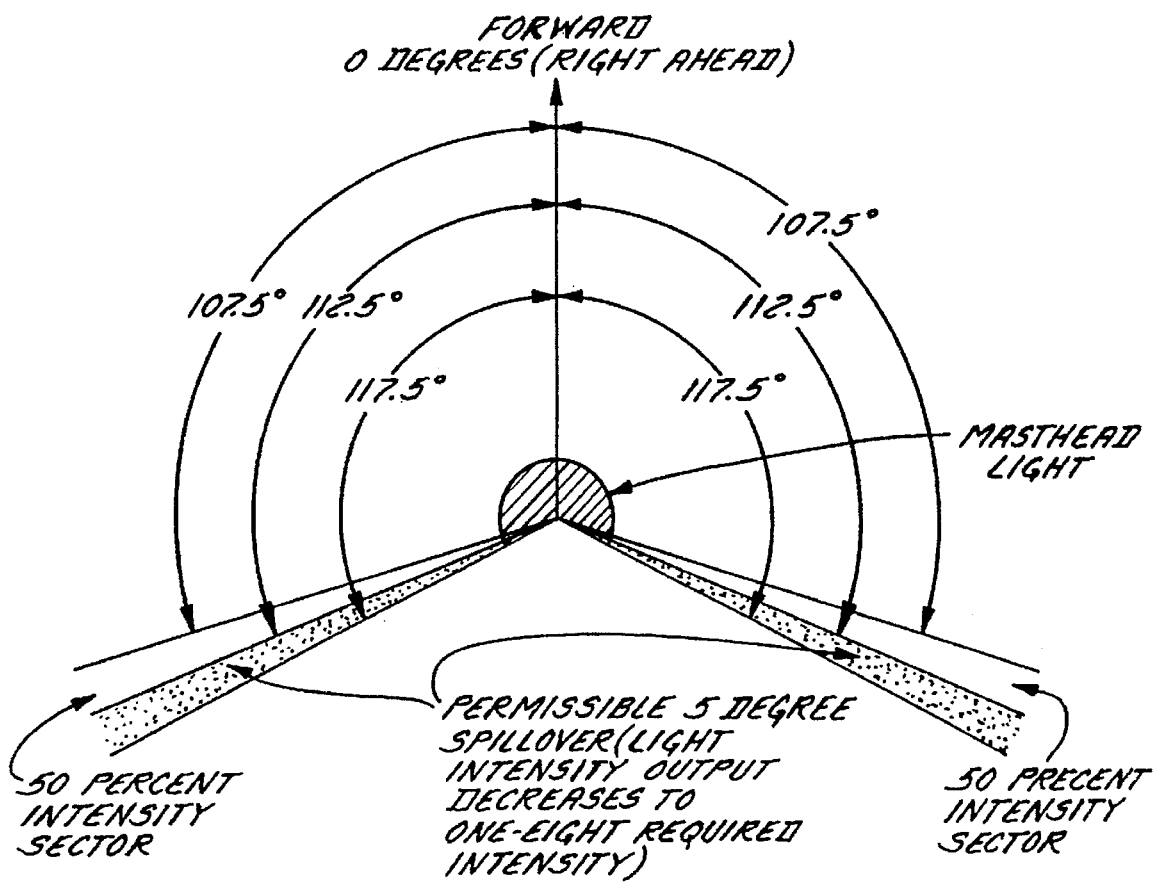
FIG. 23
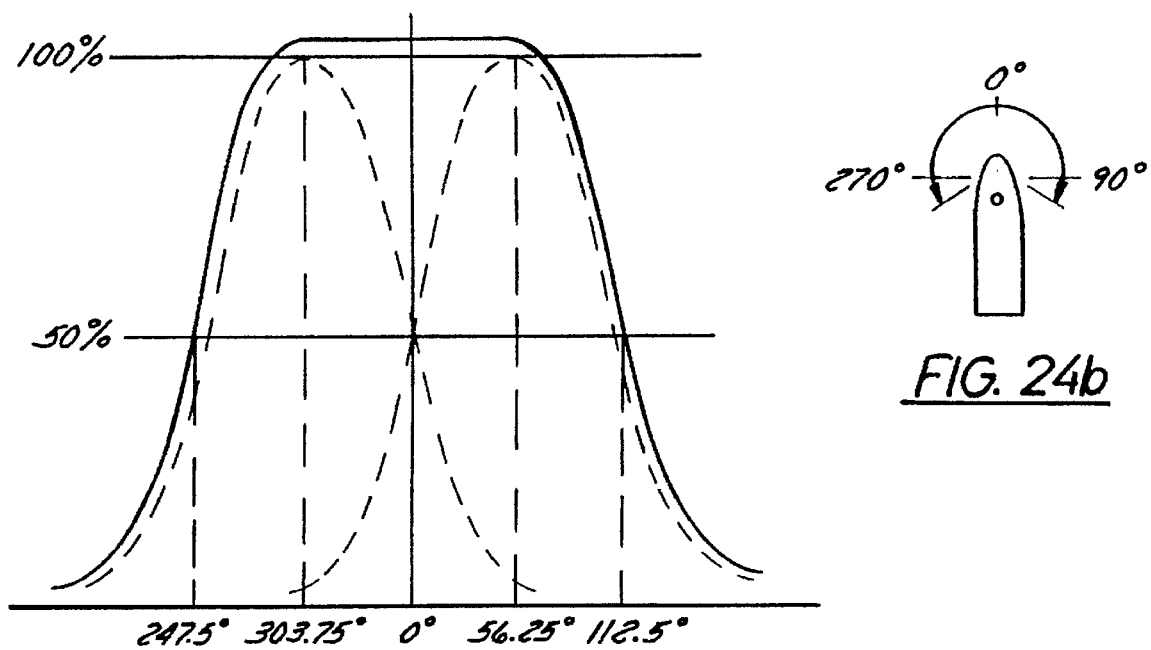
FIG. 24a
FIG. 24b

UNIVERSAL REMOTE LIGHTING SYSTEM WITH NONIMAGING TOTAL INTERNAL REFLECTION BEAM TRANSFORMER

This application is a continuation of U.S. Ser. No. 08/564,596, filed Nov. 29, 1995, abandoned Apr. 22, 1996.

BACKGROUND OF THE INVENTION

1. Field of the Invention

The present invention relates in general to the field of lighting. More particularly, the present invention relates to remote lighting systems that have a remotely located light source. The systems can be adapted and configured to address the particular requirements of an intended use. The present invention thus relates to a lighting system of the type that can be termed universal remote.

2. Discussion of the Related Art

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Historically, it was known in the prior art to provide airports with high energy approach lighting systems. Although the configuration of airport lighting systems has been optimized through years of experience, the current approach lighting systems approved by the United States Federal Aviation Administration (FAA) are probably among the oldest aviation technologies.

The conventional aircraft approach lighting system[1] includes groups of incandescent lamps distributed over a field, lighting several thousand feet of the approach to the runway with specific requirements for angular light distribution and intensity. The present system used to monitor and control the light given off by this approach lighting system (ALS) is based on an indirect monitoring method that is subject to false indications caused by variations in loop current and lamp impedance, aging effects and other factors.

A major problem with the currently used approach lighting system is light source failure. The number and location of failed lamps are critical parameters for permission to use a full approach lighting system. Lamp exchange is a significant maintenance expense.

Another problem with the currently used approach light system is that the steel towers which are presently used to support most runway approach lights create a significant collision hazard to any aircraft which approaches the runway below the proper glide path envelope. Since the separation between the proper approach path and the approach light plane decreased as the landing aircraft nears the runway threshold, the innermost towers present the greatest hazard to landing aircraft. Any new runway construction requires the installation of fragile or semi-fragile lights between the runway threshold and the 1000-foot bar. Current FAA plans call for the replacement of the existing steel towers by fragile towers.

According to ICAO and FAA regulations, currently used ALSF-2 systems must operate at 5 brightness levels, depending on the time of day (day or night), weather, visibility, and other related conditions. As a function of the selected brightness, the regulated constant current can be set at 5 discrete values. Control and monitoring of the current are provided by an electronic subsystem. This subsystem measures and regulates only electrical parameters, maintaining a constant output current. For several reasons, such as, for example, the dispersion parameters of individual incandescent lamps, aging, difference resistances in current loops, etc., even with perfect monitoring of the output current, the brightness of the lamps varies across the field. Thus, the imperfect control and monitoring that is an inherent feature of the presently used approach lighting system is another problem.

What is needed therefore is an approach lighting system having higher reliability, safer structures and a monitoring system that is less prone to false indications. What is also needed is an approach lighting system with higher efficiency, including lower maintenance costs.

In an attempt to solve these problems, various engineering solutions have been implemented. All of the control and monitoring systems proposed to date have been based on indirect measurement of the brightness of the light at the lighting point (i.e., the intensity of the visible light concentrated on a desired spot.) For example, one solution used a system in which a small radio transmitter sent information about the status of each lamp to the air traffic control tower.

These previously recognized solutions have the disadvantage of relatively high cost. Providing aircraft approach lighting systems for the world-wide market is a competitive business. A preferred solution will be seen by the end-user as being cost effective. A solution is cost effective when it is seen by the end-user as compelling when compared with other potential uses that the end-user could make of limited resources.

It was also known in the prior art to provide ships with navigation lighting systems with specific requirements for intensity, angular light distribution and light color. Similarly, aircraft and automobiles have been provided with navigation lighting systems. Lower weight, lower cost, higher reliability and higher efficiency, including lower maintenance costs, is also needed for these navigation lighting systems.

The below-referenced U.S. patents disclose embodiments that were at least in-part satisfactory for the purposes for which they were intended. The disclosures of all the below-referenced prior United States patents in their entireties are hereby expressly incorporated by reference into the present application for purposes including, but not limited to, indicating the background of the present invention and illustrating the state of the art.

U.S. Pat. No. 4,309,093 discloses a method of replicating a diffusing plate. U.S. Pat. No. 4,336,978 discloses a method for optically making a diffusion plate. U.S. Pat. No. 4,898,450, discloses an expanded beam nonimaging fiber optic connector. U.S. Pat. No. 5,365,354, discloses method of making a GRIN type diffuser based on volume holographic material.

SUMMARY AND OBJECTS OF THE INVENTION

By way of summary, the present invention is directed to a high definition universal remote lighting system that combines a light source coupled to a light pipe, or bundle of light pipes, and a beamformer coupled to each light pipe for shaping the light according to system requirements. The present invention can also include an optical switch device for direct light output monitoring. An effect of the present invention is to separate the light source from the lighting points, and to illuminate several light points with a single light source.

The advantages of the present invention include cost reduction, better monitoring and control, maintenance simplification, enhanced personnel safety, electromagnetic impulse (EMI) insensitivity, and weight/size reduction. These advantages will be appreciated in both military and commercial lighting applications. For example, the benefits of a shipboard navigation lighting system according to the present invention include elimination of the need for electromagnetic impulse shielding, a reduction in topside weight and moment, a lowering of maintenance costs, an enhancement of crew safety and a reduction of radar cross section.

An object of the invention is to provide an apparatus that includes a direct optical monitoring loop through the use of a liquid crystal optical switch device (OSD) with currently used multi-level current regulators, to provide fine light control and an absolute indication of the state of each approach lighting system light source. Another object of the invention is to provide an apparatus that is rugged and reliable, thereby decreasing down time and operating costs. Another object of the invention is to provide an apparatus that has one or more of the characteristics discussed above but which is relatively simple to manufacture and assemble using a minimum of equipment. Another object of the invention is to provide a method of remote lighting that is predictable and reproducible, thereby decreasing variance and operating costs. Another object of the invention is to provide a method that has one or more of the characteristics discussed above but which is which is relatively simple to setup and operate using relatively low skilled workers.

In accordance with an aspect of the invention, these objects are achieved by providing a remote lighting system comprising: an illuminator including a light source and an input coupler optically coupled to said light source; a light pipe optically coupled to said input coupler; and a beamformer connected to said light pipe, said beamformer including a light transformer optically coupled to said light pipe and a holographic diffuser optically coupled to said light transformer. In one embodiment, the remote lighting system is an aircraft approach lighting system further comprising a direct optical regulator and an optical switch, wherein said input coupler is optically coupled to said light source through said optical switch and said direct optical regulator is connected to said optical switch.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which:

FIG. 16b illustrates a trace of power as a function of degrees from center for a second orthogonal axis of the elliptical holographic diffuser characterized in FIG. 16a;

FIG. 21b illustrates a goniometer scan of the Y axis of the scatter pattern of the holographic diffuser illustrated in FIG. 21a;

FIG. 23 illustrates a horizontal beam spread for a mast head light according to the present invention;

FIG. 24a illustrates a mast head horizontal beam spread produced by two light shaping diffusers with 112.5° light patterns according to the present invention;

FIG. 24b illustrates a schematic view of the two light shaping diffusers whose optical characteristics are shown in FIG. 24a;

FIG. 27b illustrates a goniometer scan of a Y-axis scatter pattern from the elliptical light shaping diffuser illustrated in FIG. 27a.

DESCRIPTION OF PREFERRED EMBODIMENTS

Figure 1:
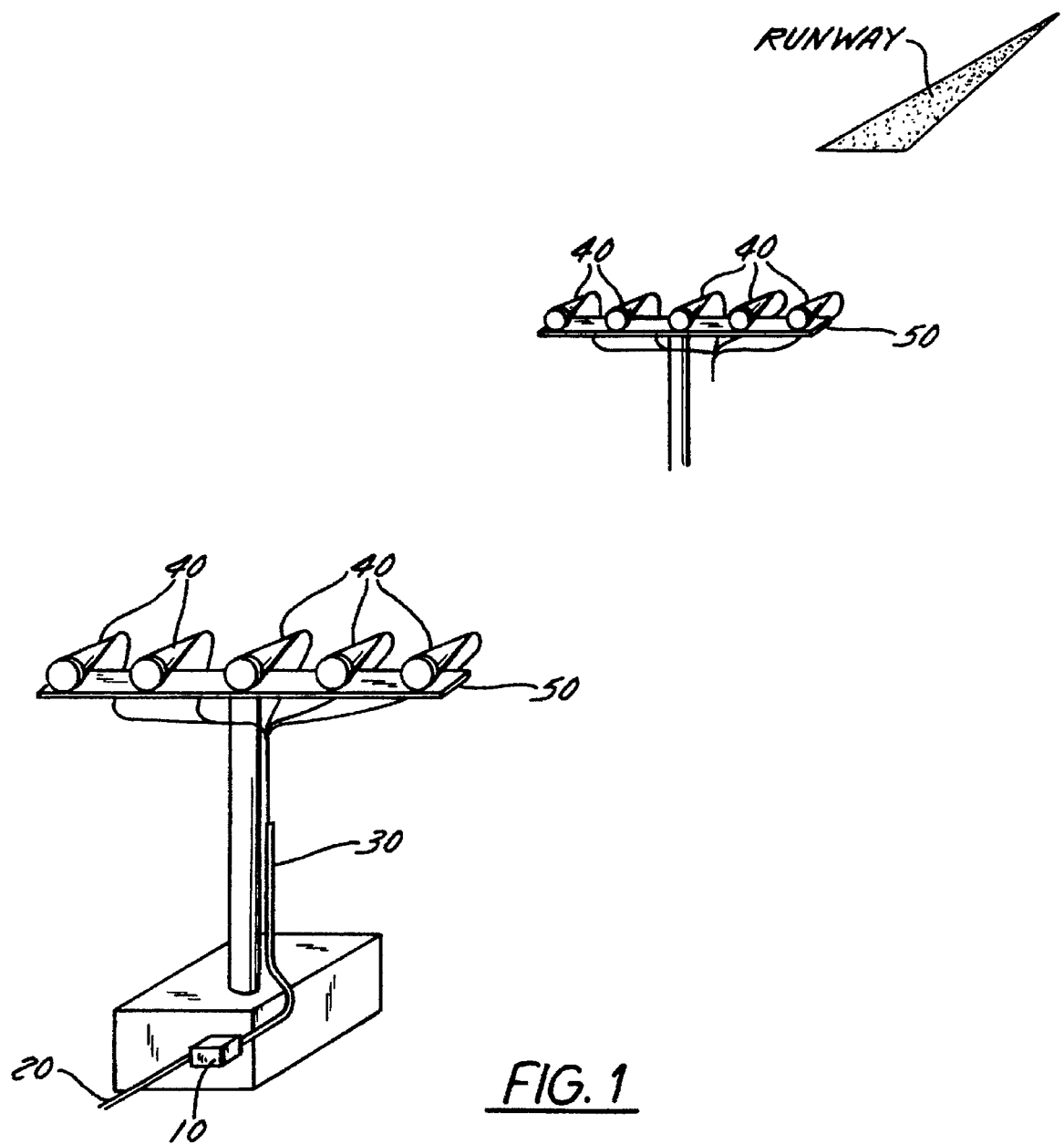
FIG. 1 illustrates an isometric schematic view of an approach lighting system according to the present invention.

The present invention and the various features and advantageous details thereof are explained more fully with reference to the nonlimiting embodiments described in detail in the following description.

The design and development of remote lighting systems typically face three major problems: 1) low coupling efficiency between source and optical fiber; 2) the need to use low loss, flexible, relatively thick (millimeters in diameter) optical fiber light pipes; and 3) the requirement to tailor the light pattern to a particular implementation with minimum power loss.

To address the problem of low coupling efficiency, a fiber optic coupler-splitter (FOCS) can be used. Specifically, the FOCS includes a bundle of optical fibers which considerably enhance light source-to-fibers coupling efficiency. Such a FOCS is designed so that its input end is optimally matched to the light source's numerical aperture, focused spot size, and shape. The FOCS output end is split in a number of branches according to the number of lighting points that are to be illuminated. The design of the FOCS should take into account the light distribution in a focused spot from the light source. The intensity of light in each branch of the FOCS can be determined by combining variable numbers of single fibers taking into account their positioning in the focused spot. Such a FOCS design demonstrates high coupling-splitting efficiency of up to approximately 70%, which is 2 to 3 times higher than conventional methods. The other advantage of the FOCS is the possibility to distribute the outgoing light between branches so as to be perfectly even, or to compensate for transmission losses in longer optical fibers.

The second problem in designing remote light systems is the optical fiber. While glass fiber has very high light transmission, a glass light pipe whose diameter is larger than a millimeter is inflexible. This rigidity precludes glass fiber from being used in any practical system where installation requires multiple fiber bends or where the use of a nonlaser light source calls for the use of fiber larger than 1 mm in diameter. Employing a fiber bundle to solve the light source-fiber coupling problem introduces additional coupling losses (e.g., from lower effective coupling area), and increases the system cost to the extent that the system cost becomes impractical.

A low cost light delivery medium that is flexible to install is an essential component of a deployable remote lighting system. An optical fiber that meets all of the requirements named above is readily commercially available from various manufactures, (e.g., Asahi; Mitsubisi; Toray; Rohm and Haas; and Lumenyte), in various sizes, such as, for example, from approximately 1 mm to approximately 25 mm in diameter. The use of this delivery medium can solve the light pipe problem.

The third problem is the formation of a light pattern. Because optical fibers distribute their light output in a cone corresponding to the fiber's numerical aperture, a light pattern with a smaller angle is usually possible only through the use of an optical stop. However, the use of an optical stop entails significant power loss. The combination of a light transformer for light collection and holographic diffusers for light shaping can enable the forming of the beam emerging from the optical fiber into any predetermined shape within a desired angle, and this can be accomplished with minimum power loss. Thus the use of a light transformer with a holographic diffuser can solve the light pattern formation problem.

I. Detailed Description of Preferred Systems

A. Approach Lighting System

Referring to FIG. 1, an approach lighting system according to the present invention is based on a remote source with direct optical monitoring (RESDOM). A remote source with direct optical monitoring aircraft approach lighting system includes three major components. The first major component is illuminator 10 which receives electrical power from power line 20. Illuminator 10 can also be referred to as a light engine. The second major component is light delivery system 30 which is connected to illuminator 10. Light delivery system 30 can be an optical fiber bundle. The third major component is the five beamformers 40. Beamformers 40 are connected to light delivery system 30 and are mounted on the horizontal lighting bar 50. The beamformers shape the output light at the lighting points according to ICAO specifications, with minimum power loss. A significant advantage provided by such a remote source with direct optical monitoring aircraft approach lighting system is that a single ground-mounted illuminator 10 will replace the five individual incandescent spot lamps that are installed on a constructed support in previous systems.

Figure 2:
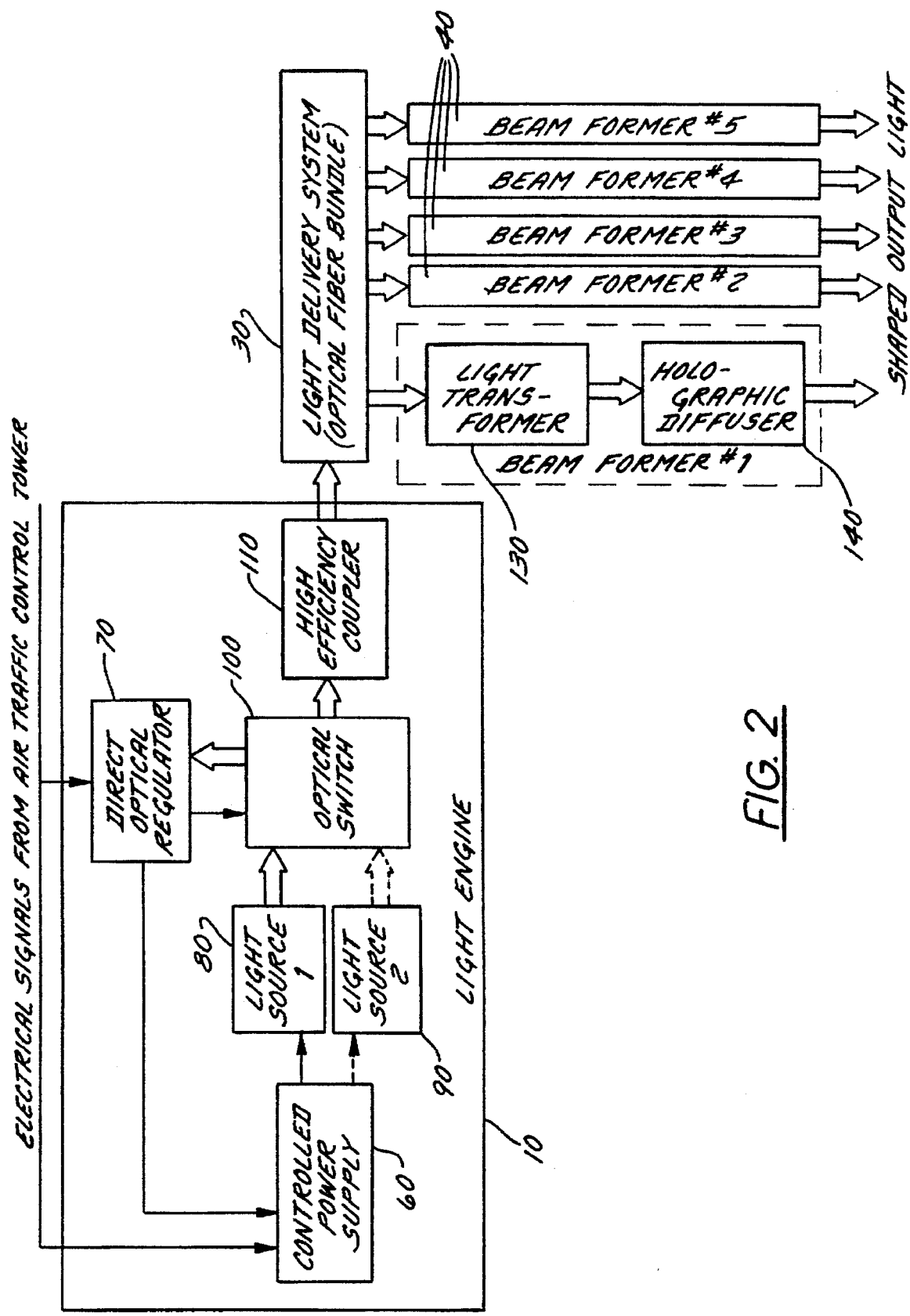
FIG. 2 illustrates a block schematic diagram of an approach lighting system according to according to the present invention.

Referring now to FIG. 2, illuminator 10 includes controlled power supply 60 and direct optical regulator 70. Electrical signals from an air traffic control tower are sent to control power supply 60 and direct optical regulator 70.

Control power supply 60 supplies power to a first light source 80. Illuminator 10 can also be provided with second light source 90 so as to provide redundancy for first light source 80. Light from the first light source 80 goes to optical switch 100. Optical switch is optionally connected to direct optical regulator 70 and high efficiency coupler 110.

Illuminator 10 is connected to light delivery system 30 through high efficiency coupler 110. Light delivery system 30 is connected to five beamformers 40.

Each of the five beamformers 40 includes a light transformer 130 and a holographic diffuser 140. Light from the light delivery system 30 goes to light transformer 130 and then to holographic diffuser 140. The resultant output light is shaped as a function of the optical characteristics of both light transformer 130 and holographic diffuser 140.

The unique combination of features offered by the remote source with direct optical monitoring approach lighting system is compared to the prior art ALSF-2 prior art system in Table 1.

B. Navigation Lighting System

Figure 3:
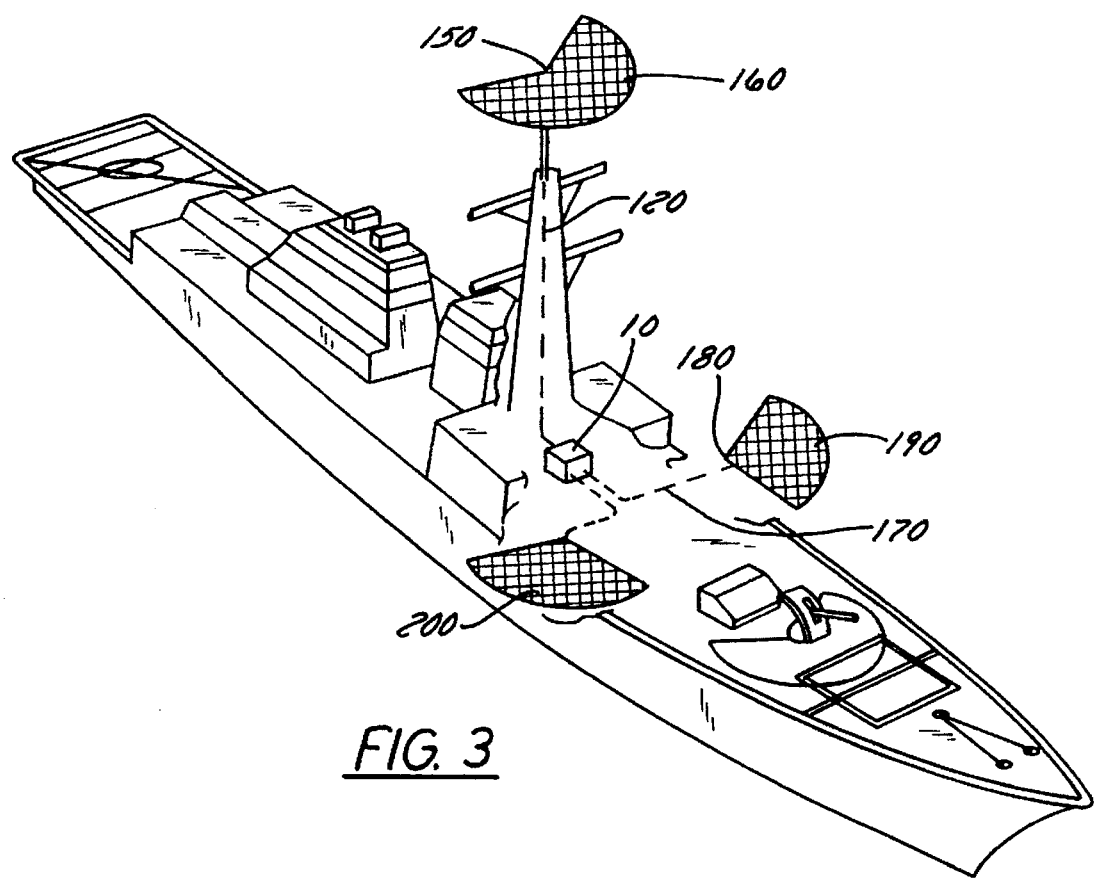
FIG. 3 illustrates a perspective view of a navigation lighting system according to the present invention.

Referring now to FIG. 3, a high-definition universal remote lighting system (URLiS) for Navy ship navigation lights is depicted. Illuminator 10 can be located deep within the ship. Light pipe for mast head light 120 is connected to illuminator 10. Mast head beamformer 150 is connected to the light pipe for mast headlight 120 and casts mast headlight pattern 160. Light pipe for port-side light 170 can be connected to the same illuminator 10. Port side beamformer 180 is connected to light pipe for port-side beam 170 and casts port-side light pattern 190. The star-board side of the ship is provided with a similar system for casting star-board side light pattern 200.

The illuminators can be installed in any appropriate space on the ship. Efficiently coupled light energy is delivered by flexible light pipe to its corresponding beamformer, located wherever the beamformer is required to provide navigation lighting in accordance with Navy standards. The use of the universal remote lighting system for this purpose will reduce electromagnetic impulse susceptibility and electromagnetic

TABLE 1

| Comparison of RESDOM approach lighting system and ALSF-2 | | | |
|---|---|---|---|
| Feature | ALSF-2 | RESDOM ALS | Comments |
| Number of lighting sources required | | | |
| white light | 174 | 34 | One light source replaces five PAR 56 incandescent lamps |
| red light | 54 | 18 | |
| green threshold bar | 49 to 101 | 10 to 20 | |
| Power savings | ~150 kW | ~30 kW | Proposed system has at least 5 times greater efficiency |
| Indirect brightness control | Yes | Yes | |
| Direct optical brightness monitoring | No | Yes | Direct optical regulator with optical feedback loop incorporated in the illuminator |
| Light source redundancy | No | Yes | Two light sources with a liquid crystal optical switch in illuminator |
| Single light source lifetime | 500 h | 1000 to 1500 h | High reliability, lower maintenance costs |
| Total mass presented on light bar | ~50 lb | ~5 lb | Reduced structural demand, less damage to aircraft on impact |
| Electrical wires present on light tower | Yes | No | Reduced likelihood of electrically ignited fire from impact |
| Light source location | On mast | On the ground | Ease and low cost of maintenance and repair |

Table 1 shows that the expected power balance in the system according to the present invention will be at least five times better. One light source can be used to illuminate five lighting points while meeting the minimum candela requirements of the ICAO. The support structure will be resistant to low impact, will be strong enough to mechanically support a light bar with five luminaries, and will be structurally suited to holding the light delivery system (optical fiber bundle). The principal advantages of the remote source with direct optical monitoring approach landing system as compared to existing systems (ALSF-2, SSALR, MALSR) include: direct optical light monitoring, high power efficiency, ease and low cost of handling, ease of maintenance and repair, high reliability, light source redundancy, a single source lifetime that is two to three times longer, reduced structural demands on the supporting structure, less mass presented to any impacting aircraft and a reduced likelihood of electrically ignited fire resulting from impact.

noise, reduce topside weight and moment, reduce radar cross section, eliminate the need for bulky shielding, simplify maintenance, and increase crew safety and reduce cost.

Figure 4:
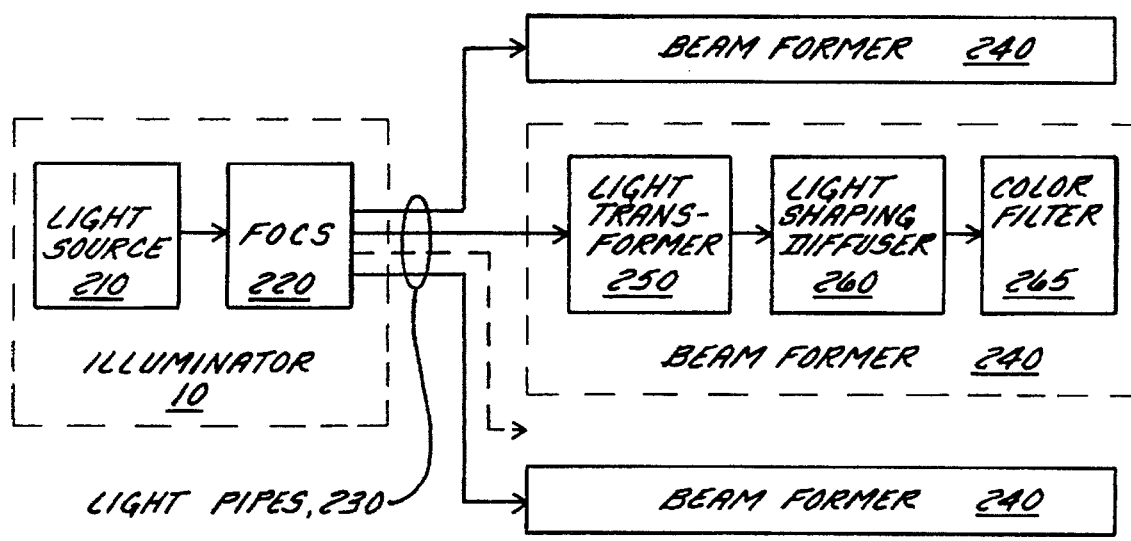
FIG. 4 illustrates a view of a block diagram of a universal remote lighting system according to the present invention.

Referring now to FIG. 4, a block diagram of the high definition universal remote lighting system is depicted. Illuminator 10 includes light source 210 and fiber optic coupler-splitter (FOCS) 220. Light from light source 210 goes to fiber optic coupler-splitter 220 and then to light pipes 230. The light then goes from light pipes 230 to beamformers 240. Each of beamformers 240 includes light transformer 250, light shaping diffuser 260 and color filter 265. The light entering beamformer 240 goes first to light transformer 250 and then to light shaping diffuser 260.

II. Detailed Description of Preferred Components

A. Illuminator

The illuminator includes two major components. The first component is a combination of a light source with an elliptical or parabolic reflector. This component generates energy in the visible range and concentrates the generated light in a spot. The second component is a coupler-splitter. This second component couples the light concentrated in a focal spot from the light source into the optical fibers and splits coupled light between fibers. For best performance, the illuminator should have: maximum outgoing light flux to illuminate multiple lighting points; maximum light source efficacy for lowest power consumption; high efficiency of light collection, coupling and splitting; and maximum outgoing light flux concentration. The figure of merit for illuminator evaluation is illuminator efficiency $\eta_I$:

$$\eta_I = \eta_{coll} \times \eta_{coup} \times \eta_{split} \quad (1)$$

where $\eta_{coll}$ is light collection efficiency, $\eta_{coup}$ is light coupling efficiency, and $\eta_{split}$ is light splitting efficiency.

1. Light Source/Reflector Combination

The principal component of an illuminator is the light source. To evaluate various candidate light sources for a RESDOM approach lighting system, the following calculations can be used. ALSF-2 requirements call for a luminous intensity I of 16,000 candelas to be distributed in a solid angle $\omega = \alpha \cdot \beta$, where $\alpha = 28°$ is the horizontal angle (0.49 rad), and $\beta = 8°$ is the vertical angle (0.14 rad). The luminous flux needed to create this intensity is $$\Phi' = I \cdot \omega = 16{,}000 \cdot 0.49 \text{ rad} \cdot 0.14 \text{ rad} = 1088 \text{ lumens}. \quad (1)$$

Assuming the efficiency of the total system to be 46%, an input of $$\Phi = \Phi'/\eta = 1088/0.46 = 2365 \text{ lumens} \quad (2)$$

is required. Because them are five light points on a post, we multiply the value of $\Phi$ by 5:

$$\Phi_\Sigma = 5\Phi = 11{,}826 \text{ lumens}. \quad (3)$$

Assuming that the efficacy of the light source is 40 lm/W, the electrical power required for the light source is $$P = 12{,}000 \text{ lm}/40 \text{ lm/W} \cong 300 \text{ W}. \quad (4)$$

A 330-watt Q20A/PAR56/2 lamp is used in the ALSF-2 for each light point. Thus, the remote source with direct optical monitoring approach lighting system is at least 5 times more efficient than the current ALSF-2 system.

Tungsten filament lamps, including halogen lamps, can be used with the universal remote lighting system. The most important characteristic of these two types of lamps are shown in Table 2.

TABLE 2

Characteristics of Tungsten Filament and Arc Lamps

| Characteristic | Tungsten | Arc |
|---|---|---|
| Emission of Light (lumen/mm²) | 5 to 7 | 15 to 20 |
| Efficiency (lumen/watt) | 10 to 25 | 30 to 40 |
| Light Body Maximum Dimension (mm) | 5 to 20 | 2 to 3 |
| Light Body Location Accuracy | Arbitrary | Repeatable |
| Color Temperature, K. | 2,500 to 3,300 | 3,500 to 5,000 |
| Lifetime (hours) | 1,000 to 2,000 | 2,000 to 4,000 |
| Cost | Relatively Low | Relatively High |

Table 2 shows that arc lamps have significant advantages over tungsten light sources, although they are more expensive.

Currently, there are several short-arc xenon lamps in the appropriate power range that are readily commercially available. These lamps are designed to be combined with standard elliptical or aspheric reflectors. Table 3 shows a comparison of several such lamps that provide illumination flux of approximately 12,000 lumen, or more. The lifetime of these lamps is three to four times longer than that of the lamps used in prior art approach landing systems.

TABLE 3

Basic Parameters of Short-Arc Xenon Lamps for Use in the RESDOM approach lighting system

| | Lamp | | |
|---|---|---|---|
| Parameters | ORC XM-500-3HS | Xenon LX/450-2 | Hamamatsu L5431 |
| Power (W) | 500 | 450 | 575 |
| Total Flux (lm) | 14,000 | 13,000 | 49,000 |
| Arc Gap (mm) | 2.5 | 0.9 × 2.7 | 85 |
| Average Life (hr) | 1,500 | 2,000 | 1,000 |
| Reflector | AR-108 | — | ER 45322 |
| Size of Focal Spot at Second Focus (mm) | 12.7 | 11.0 to 14.0 | 22.1 |

Table 3 shows that the use of any of these short-arc xenon lamps will reduce the system's maintenance cost and increase system reliability.

The remote source with direct optical monitoring approach lighting system offers an advantage of using dual light sources in the illuminator (see FIG. 2). In case of lamp failure, the reference light no longer sends out radiation, and the optical feedback loop through the microprocessor will switch the controlled power supply to the reserve light source. An electrical signal will be sent to the air traffic control tower in real-time to report the light source failure. The switching time (from "no light" to "full power" mode) will be on the order of 2 to 3 seconds, depending on the source selected and the design of the power supply.

2. Fiber Optic Coupler-Splitter

Although the present invention is fully suitable for use with a single light pipe and a single beam transformer, unexpectedly improved results are obtained when multiple beamformers are powered by a single light source. In order to power multiple beamformers with a single light source, the light source can be coupled to the beamformers with a coupler-splitter. The coupler-splitter functions as a means for distributing the light from the light source. The coupler-splitter can be a fiber optic coupler-splitter, a prismatic beam splitter or any other device suitable for spatially modulating the energy from the light source.

Figure 5:
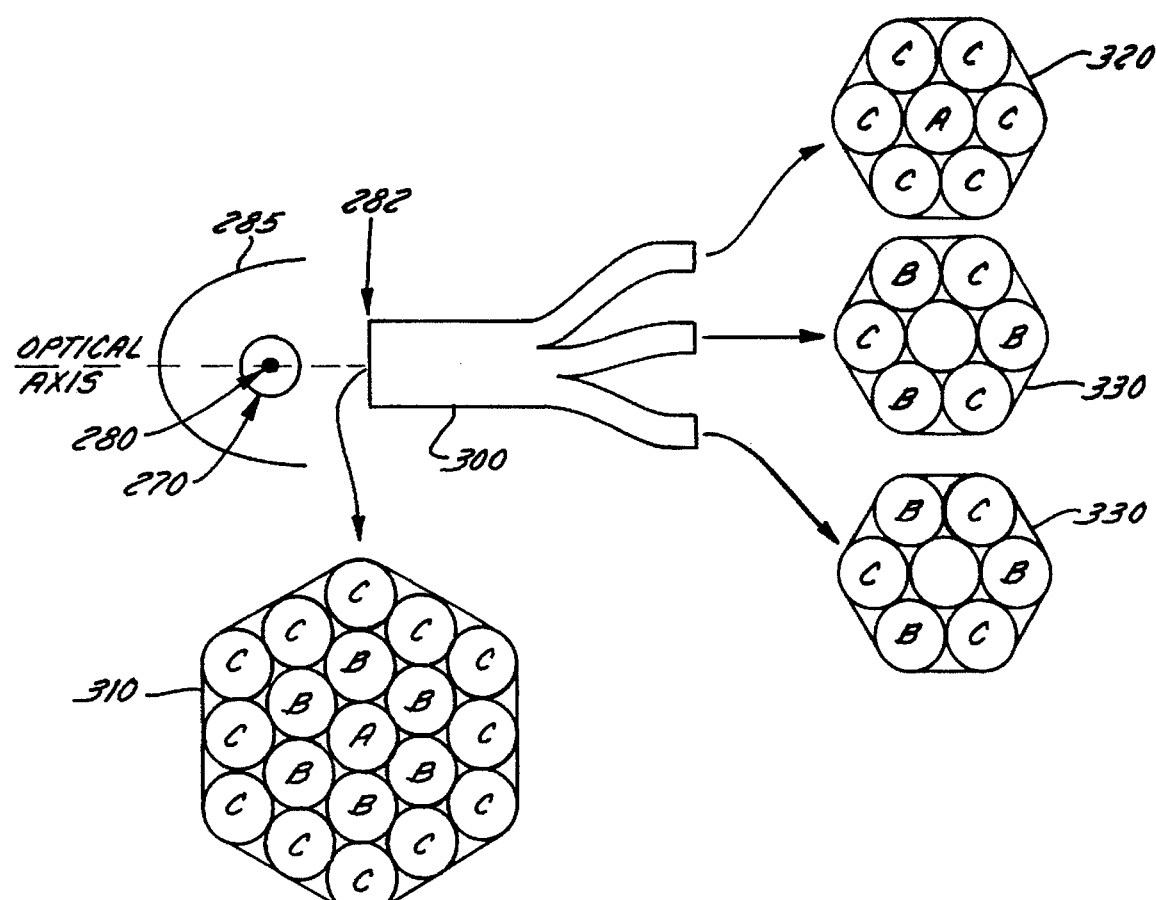
FIG. 5 illustrates a schematic view of a source coupled to a coupler-splitter according to the present invention.

Referring now to FIG. 5, a fiber optic coupler-splitter (FOCS) for use with the present invention is depicted. Light source 270 is located at the primary focal point 280 of elliptical reflector 285. An input end of FOCS 300 is located in the plane of secondary focal point 282 of elliptical reflector 285 perpendicular to reflector 285 axis. An input end of FOCS 300 includes several levels (i.e., A, B, C) of small diameter optical fibers 310.

The output end of FOCS 300 is split into a number of branches 320, 330, and each branch is connected to a light pipe. Depending on light distribution in the plane of secondary focal point 282, the number of branches, and the required intensity in each branch, various combinations of small optical fibers from different levels can be used to provide even (330) or non-even (320) illumination in the branches. The FOCS will provide very high light-source-to-pipe coupling efficiency (e.g., greater than approximately 70%).

3. Optical Switch

The optical switching device (OSD) is a solid state solution to switching, or coupling, light without conversion to electrical signals. The optical switching device requires no mechanical or moving components. The transmitted light has two modes of polarization. The polarization rotation is performed electronically in a solid state liquid crystal rotator.

Figure 6A:
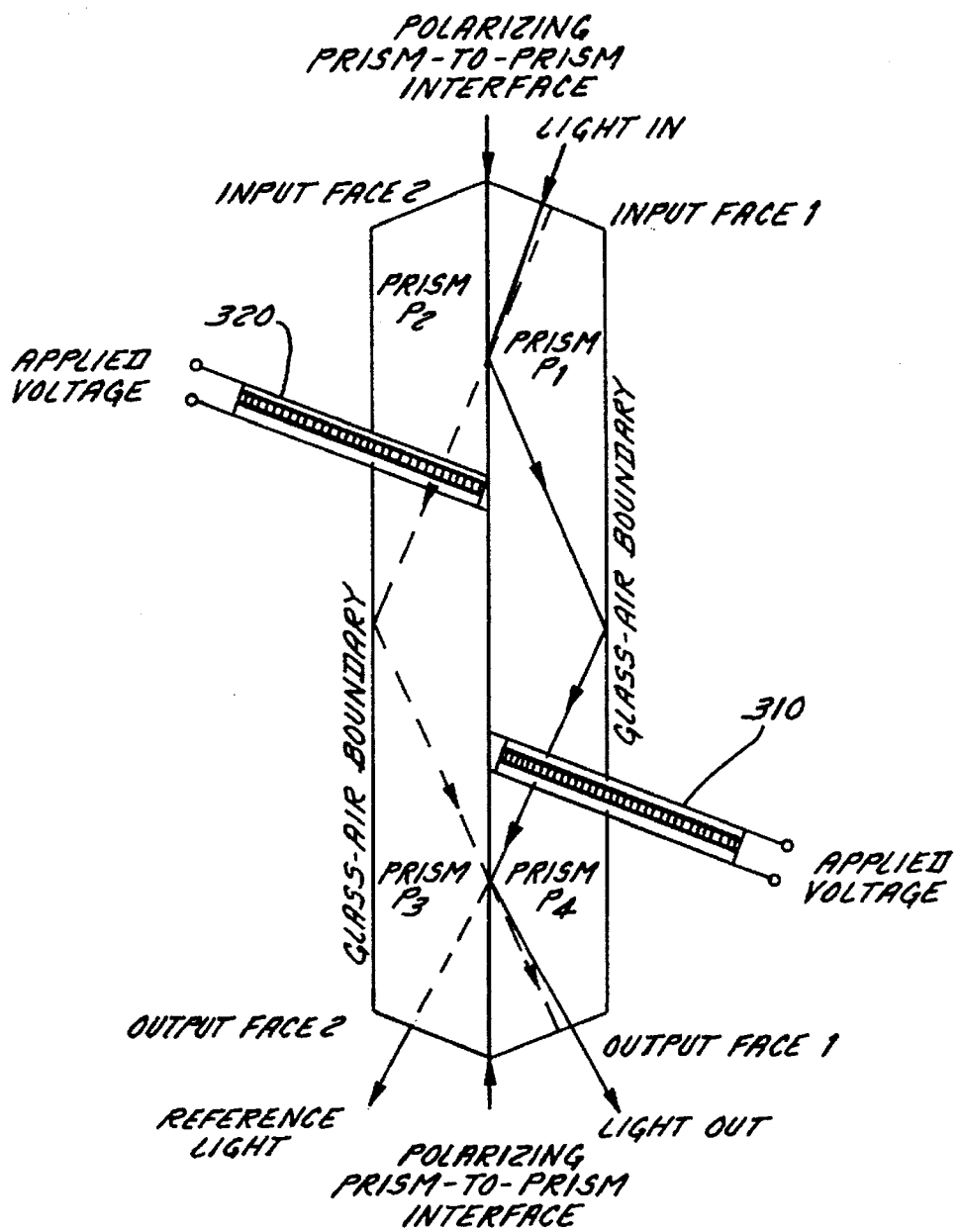
FIG. 6a illustrates a schematic view of an optical switch according to the present invention.

Referring now to FIG. 6a, the principle of operation of the optical switch device is illustrated. The essential features of the optical switch device are a polarizing prism-to-prism interface, a first liquid crystal rotator 310 and a second liquid crystal rotator 320.

When light enters prism $P_1$ so as to form a Brewster angle with the normal to the $P_1$ $P_2$ interface, the light is split into two beams with orthogonal polarizations, as prisms $P_1$ and $P_2$ form a conventional polarizing beam splitter. One beam reflects off the interface between the two prisms, and the other passes through the interface. Both are reflected off the glass-air boundaries. When voltage is applied to the liquid crystal rotators 310 and 320, the polarization vectors are rotated. Therefore, the beam reflected at the $P_1$ $P_2$ interface is now partially transmitted through the $P_3$ and $P_4$ interface and the one transmitted through the $P_1$ $P_2$ interface is now partially reflected from the $P_3$ $P_4$ interface. In this way, the two beams are combined again and the energy is divided between the output and the reference beam channels depending on the voltage applied to each liquid crystal cell. Since polarization rotators are not absorptive, the control of the light distribution is accomplished with minimal losses, (e.g., approximately 1 dB). The unique solid state construction provides low insertion loss, extreme durability, mechanical integrity and long life with concomitant economies in both size and price.

Figure 6B:
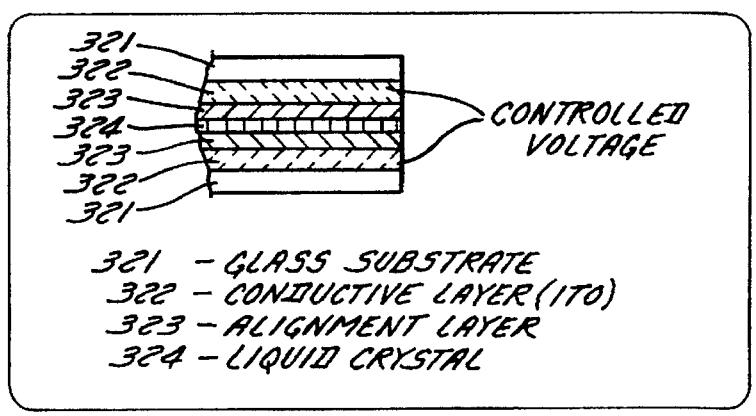
FIG. 6b illustrates a schematic sectional view of a liquid crystal rotator according to the present invention.

Referring now to FIG. 6b, the construction of the liquid crystal rotators can be appreciated. A liquid crystal layer 324 is sandwiched between alignment layers 323. The alignment layers 323 are adjacent conductive layers 322. Conductive layers 322 can be indium tin oxide. The conductive layers 322 are coated on glass substrates 321. Of particular importance to the disclosed application is the fact that the optical switching device is extremely useful in providing redundancy. The reserve lamp is coupled to the second input optical switching device which can easily connect the reserve light source to the lighting point.

4. Direct Optical Regulator

Figure 7:
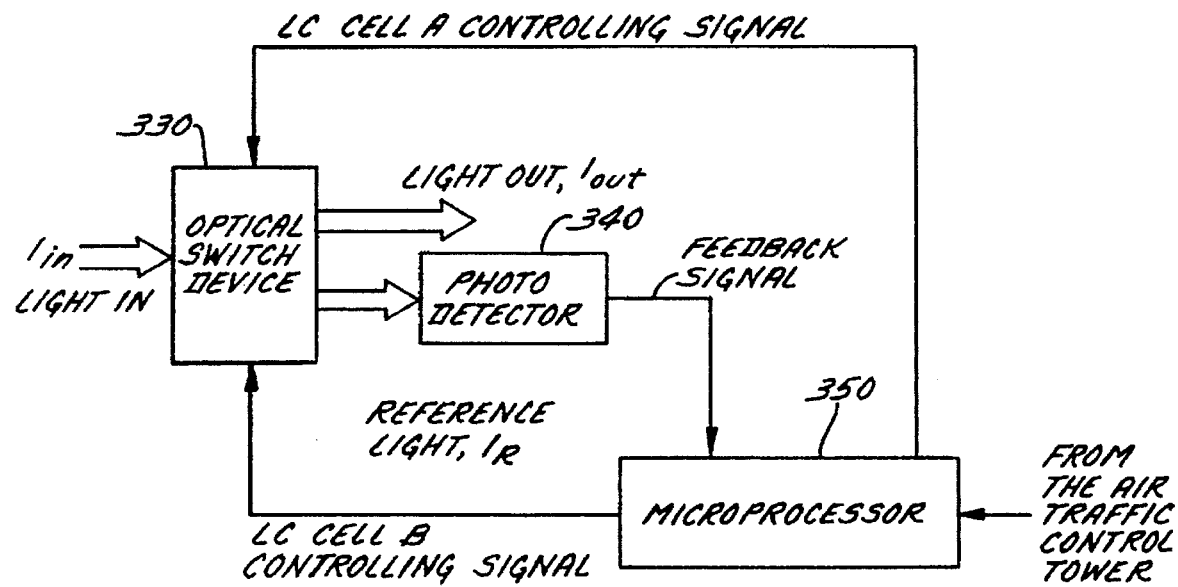
FIG. 7 illustrates a view of a block diagram of an optical switch according to the present invention.

Referring now to FIG. 7, a functional diagram of the direct optical regulator is depicted. The direct optical regulator consists of an optical switching device 330 and an optical feedback loop with a photodetector 340 and a microprocessor 350. Reference light from optical switch device 330 goes to photodetector 340. A feedback signal from photodetector 340 is transmitted to microprocessor 350. Input from an air traffic control tower can also be sent to microprocessor 350. In response, microprocessor 350 sends controlling signals to a liquid crystal cell A in optical switch device 330 and also sends controlling signals to a liquid crystal cell B in optical switch device 330.

The basic reason to implement the optical switch device 330 with the illuminator is to provide direct optical light monitoring. As discussed above, the input light $I_{in}$ is split into two beams, the output beam $I_{out}$ and the reference beam $I_R$. Because the output light varies with changes in the signal applied to the LC cell, the reference signal can be used to monitor the signal. The relation between the input, output and reference light intensities is given by the equation $$I_{in} = I_{out} + I_R \quad (5)$$

Any change in the output light $\Delta I_{out}$ is accompanied by a proportional variation of the reference light $\Delta I_R$. Therefore, $\Delta I_R$ can be transformed into an electrical feedback signal to compensate for variations in the output light by providing a corresponding change in the voltage applied to the liquid crystal cell in the optical switch device.

Electrical signals from the air traffic control tower corresponding to selected levels of approach light system intensity are input to the microprocessor 350. The microprocessor 350 generates both a controlling signal (fed into LC cell A) and a monitoring signal (fed into LC cell B). The output light $I_{out}$ must be equal to the specified value to provide the required intensity from each luminair. The reference light will be determined by $$I_R = I_{in} - I_{out} \quad (6)$$

The detector converts the optical signal $I_R$ to an electrical feedback reference signal, to confirm that the selected output intensity level is being maintained. Any variation of the input light will be reflected by a change in this feedback reference signal. As a result, the microprocessor will change the monitoring signal (fed into LC cell B) to regulate the output light by changing the distribution of light between the output and reference beams.

B. Light Delivery System

Effective remote source lighting depends strongly on the light transmissive medium used to convey the light from the light source to the desired output location. The light transmissive medium, hereafter referred to as the light pipe, can be either a liquid or a solid material that relies on total internal reflection to transmit light from the source to the output device. To achieve total internal reflection, the light pipe is usually encased in a tube of lower refractive index material, often a fluoropolymer. The range of applicability of light pipes to remote source lighting depends on the amount of light that can be transmitted through the pipe. Several factors influence the transmission efficiency of a light pipe. These include its inherent light absorbance at the wavelengths being transmitted, light absorbance by impurities present in the light pipe, and light scattering losses due to particulate materials, interfacial roughness, defects located between the light pipe core and the lower refractive index encasing material, and density fluctuations.

Two methods of remote source lighting based on light pipes are currently available. The first utilizes a light pipe consisting of bundles of glass or polymethylmethacrylate (PMMA) fibers. The second method employs a single, large diameter, solid core, flexible plastic rod as the light guide.

In bundled light pipes, the typical diameter of individual fibers is very small, which leads to flexibility (glass and PMMA are brittle materials). Many fibers are collected into a single bundle light guide, which results in two major drawbacks. First, regardless of the light transmission characteristics of the fiber material, a significant loss of light is suffered at the interface with the light source, due to the packings void fraction, rendering the fiber bundle system less efficient than a solid core material. Second, because the individual fibers are brittle, thermal or physical shock, as well as excessive bending, can break individual fibers within the bundle, further reducing the delivered light flux.

Large diameter, flexible light pipe is currently produced by two distinct processes. The first, "batch casting," employs a polymerization technique in which a length of flexible tubing is filled with the polymer precursor followed by polymerization within the tube. This procedure is limited by the physical size of the available polymerization facility and leads to inconsistency of quality which is inherent in any batch process. The second process is based on continuous extrusion of the light pipe.

Large diameter, flexible plastic optical fibers are readily available from a number of commercial suppliers, (e.g., Asahi; Mitsubishi; Toray; Lumenyte; and Rohm and Haas). Single fiber diameter varies from 3 mm to 19 mm with a length of up to 150 meters. The preferred characteristic of these fibers is that optical losses are from 150 dB/km to 400 dB/km. (Although even lower optical losses would be more preferred, the theoretical limit for minimal losses in plastic optical fiber is approximately 120 dB/km.)

C. Beamformer

The third component of the remote lighting system is the end device, (i.e., the beamformer). In the past, conventional optics (e.g., lenses, reflectors), as well as beam vignetting, have been used for shaping outgoing light into a desired pattern. The conventional techniques have two major disadvantages: 1) difficulty related to fine shaping requirements, such as obtaining a 5° 50% intensity sector and a 5° permissible spillover sector in a masthead navigation light; and 2) power losses, which can be up to 30% of generated power value.

For an optical fiber delivery system, outgoing light distribution is fully determined by the fiber's numerical aperture. It follows from numerical apertures of from 0.5 to 0.6 that the spread angle of light distribution is 60° to 70°. To address this problem, two technologies can be combined: a light transformer and a holographic light shaping diffuser (LSD) as a pattern former.

1. Light transformer

The first major component of the beamformer is the light transformer. A light transformer can be contrasted to a light concentrator. The difference is that the light transformer has been adapted so as to operate in a direction that is opposite to the normal operational direction of a light concentrator. That is, the light transformer couples light from the light pipe and reduces its flux density per unit area so as to optimize the energy profile of the light from the light pipe for its intended use.

Nonimaging optical (NIO) elements can be used in a number of different fiber optic applications. This new technology can be applied to such diverse fields as laser-fiber coupling for medical sensors and incoherent light collimation in long path-length spectroscopic detection using both metallic nonimaging optical elements and packaged nonimaging optical connectors and couplers. Nonimaging optical devices can attain higher intrinsic optical efficiency in beam collimation and focusing than conventional imaging optic lenses. In addition, the physical structure and composition of the nonimaging optical elements allows the nonimaging optical elements to be easily aligned with optical fibers, and the nonimaging optical elements can be radiation hardened and made environmentally rugged.

Unlike imaging optics approaches to beam concentration, nonimaging optical couplers function in a manner that avoids the constraint of guiding light waves by spatial mapping (imaging). More specifically, the requirements placed on an imaging system are far beyond those needed for perfect concentration/collimation systems.

Figure 8:
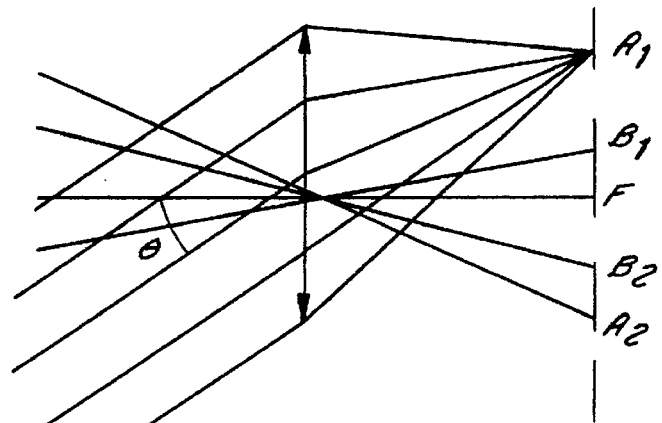
FIG. 8 illustrates an elementary lens as an imaging concentrator in a Fourier-transformed geometry.

Consider a typical imaging-concentration system, i.e., an elementary lens in a Fourier-transform geometry (see FIG. 8). Here, sharp imaging is required only at edge points in order to realize "perfect" concentration (this is the so-trilled edge effect), while the remaining intermediate areas can be imaged with relatively large aberrations. Unfortunately, in the case of the imaging system shown in FIG. 8, the off-axis aberrations are usually higher than on the on-axis ones, violating the optimization principle based on the edge effect. As a result, it is evident that imaging systems are not well suited to optical concentration/collimation, especially for large numerical apertures (NA>0.2).

The next important disadvantage of imaging systems is their physical geometry. Their transverse dimensions are significantly larger than their longitudinal dimensions. This creates several problems connected with space gaps between optical elements, resulting in alignment difficulties, mechanical instability and high Fresnel losses at interfaces. Nonimaging optical elements circumvent the aberration losses of conventional imaging optics, and can attain the highest output brightness permissible by the second law of thermodynamics.

Figure 9:
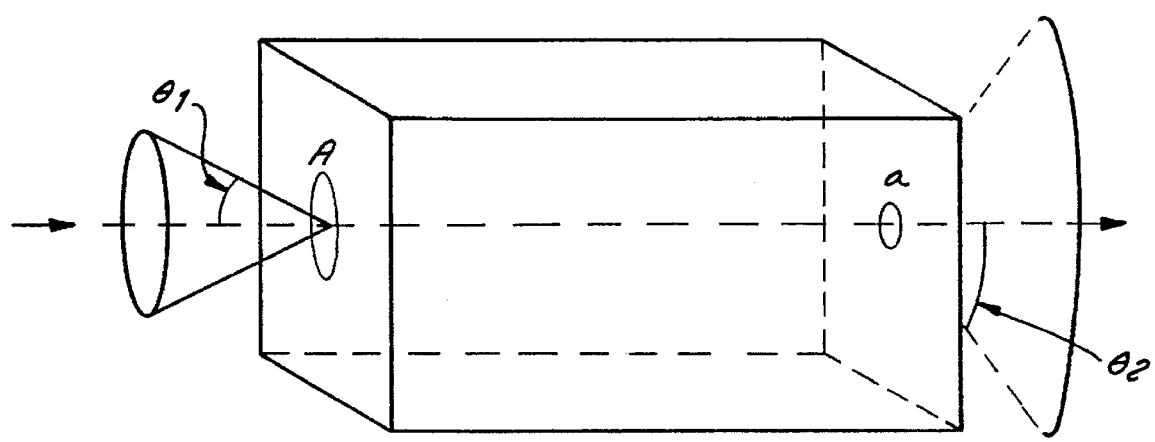
FIG. 9 illustrates Liouville's theorem for optical systems (imaging or nonimaging)
Figure 10:
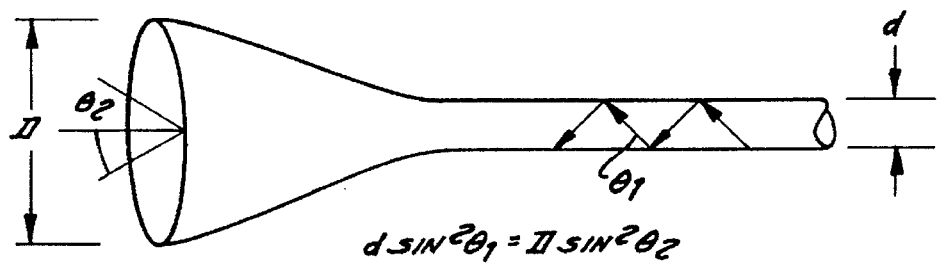
FIG. 10 illustrates a schematic view of a nonimaging optical concentrator according to the present invention.

In any concentrating/collimating system there exists a fundamental limit derived by Liouville, and illustrated in FIG. 9. As FIG. 9 implies, a decrease in the cross-sectional area of a beam is accompanied by a corresponding increase in the divergence. The area of the entering spot multiplied by the sine of the entrance angle squared is a constant of the system, referred to as the Liouville invariant. The nonimaging optical structure attains the optical concentration or collimation using a unique quasi-paraboloid or hyperboloid geometry (see FIG. 10). This structure can be realized in either a dielectric or metallic configuration. The former operates on the principle of total internal reflection (where the reflection coefficient is 100%), while the latter relies on low loss reflection from a highly polished metal surface to concentrate the beam onto the detector.

Figure 11:
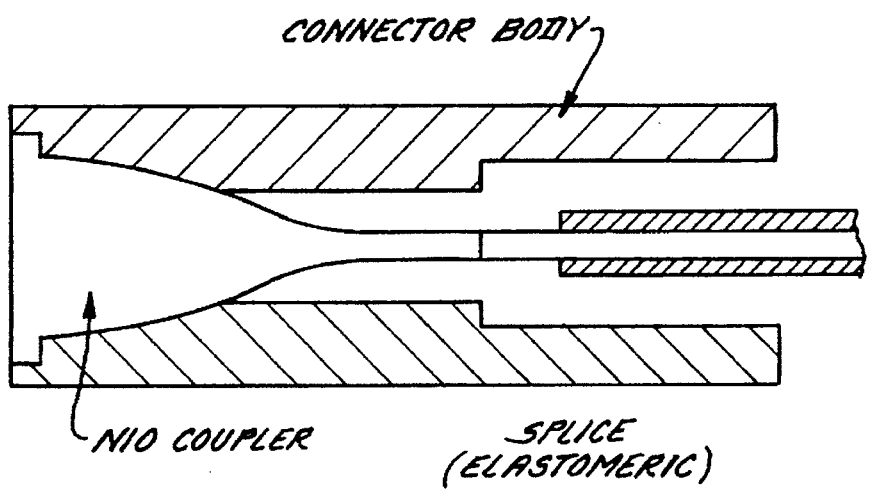
FIG. 11 illustrates a schematic sectional view of a packaged expanded beam coupler using a nonimaging optical coupler according to the present invention.

To date, most dielectric nonimaging optical collectors have been relatively large since they were designed for solar energy applications. Consequently, new micro-fabrication techniques must be used in order to reduce the size to one usable in fiber optic applications. The challenge is to both down-scale the fabrication technique and devise a means to apply an anti-reflection (AR) coating to the end-face of the nonimaging optical coupler to suppress Fresnel loss. This would achieve, in principle, an optical efficiency of nearly 100%. The fiber would then be butted against the entry face of the concentrator as shown in FIG. 11.

Similarly, metallic reflective nonimaging optical couplers can be fabricated by metallizing or machining surfaces. The advantage of this approach is that it eliminates the need for minimizing Fresnel losses by AR coatings and allows convenient connector coupling. However, the insertion loss in this case will be determined by the reflectivity of the metal surface.

Figure 12A:
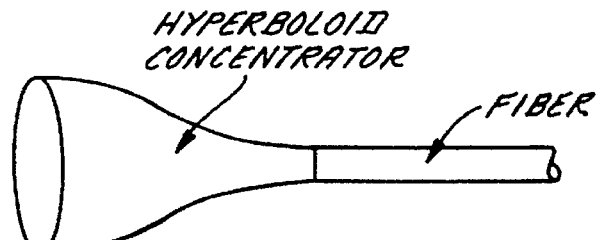
FIG. 12a illustrates a schematic view of a hyperboloid nonimaging optical concentrator according to the present invention.
Figure 12B:
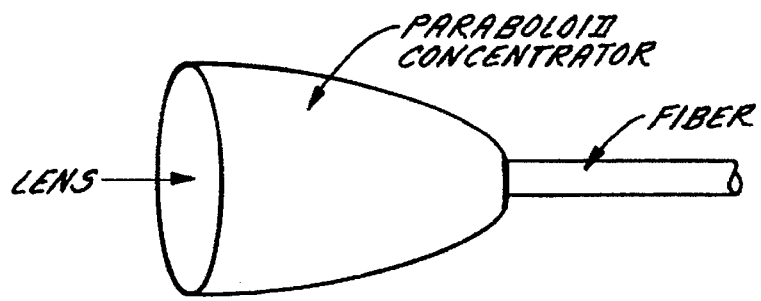
FIG. 12b illustrates a schematic view of a paraboloid nonimaging optical concentrator according to the present invention.

The coupler geometry can either be hyperboloid or paraboloid as shown in FIGS. 12(a) and (b), respectively. In the practical fabrication of nonimaging optical couplers, concentrating effects may be more easily accomplished by the parabolic nonimaging optical shown in FIG. 12(b). Such an nonimaging optical can have a convex front surface to augment the focusing property of the coupler.

Before the final specification of the nonimaging optical design can be made, such parameters as operating wavelength, expected maximum angle of divergence, and size of the beam, must be known. Given this information, a computer program can output the fabrication specifications needed to achieve the highest concentration possible.

The following sections describe the optical properties of nonimaging optical concentrators for fiber optic applications. In concentration applications, the surfaces of the nonimaging optical elements have only one type of profile over the length of the element. For fiber optic applications, it is necessary to incorporate two profiles over the length of the nonimaging optical element in order to transform the fiber numerical aperture to the nonimaging output numerical aperture. That is, nonimaging optical elements used in fiber optic applications are more correctly called numerical aperture transformers than concentrators.

Figure 13:
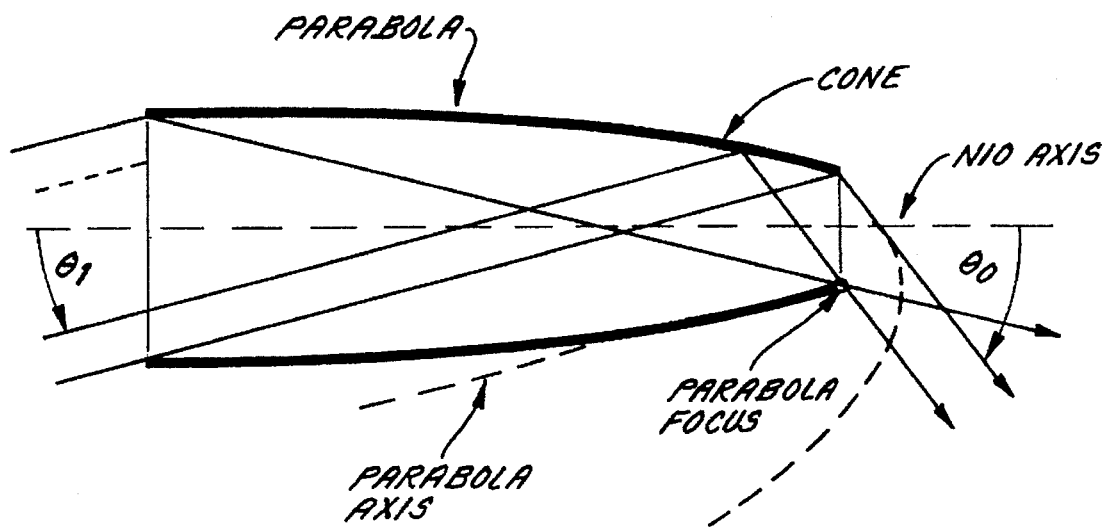
FIG. 13 illustrates a schematic view of a compound parabolic transformer (CPT) design showing multiple surface profile components according to the present invention.
Figure 14A:
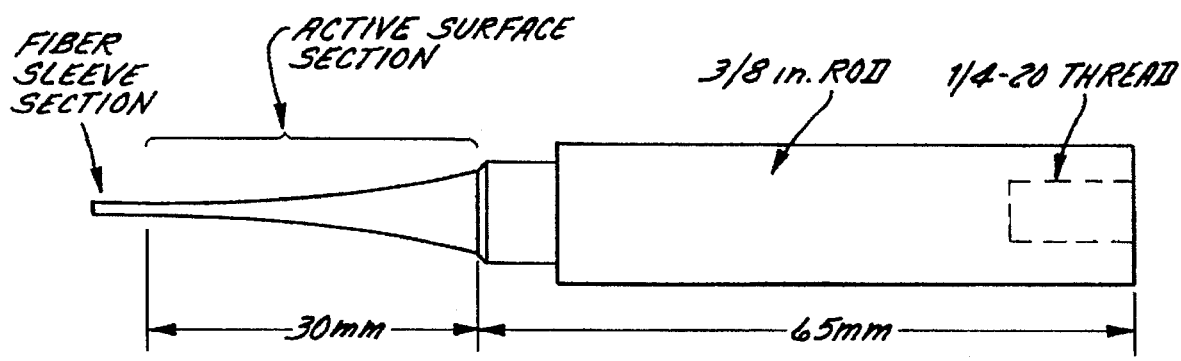
FIG. 14a illustrates a nonimaging optical mandrel fabrication step of diamond turning the nonimaging optical morphology onto an aluminum mandrel according to the present invention.
Figure 14B:
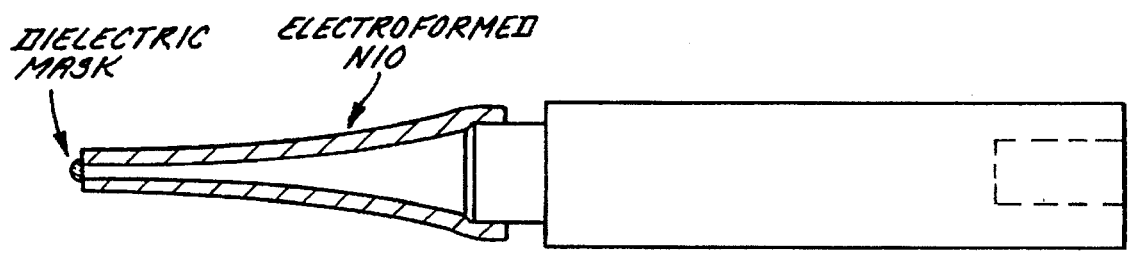
FIG. 14b illustrates a nonimaging optical mandrel fabrication step of masking the tip of the mandrel with an electrodeposited nickel according to the present invention.
Figure 14C:
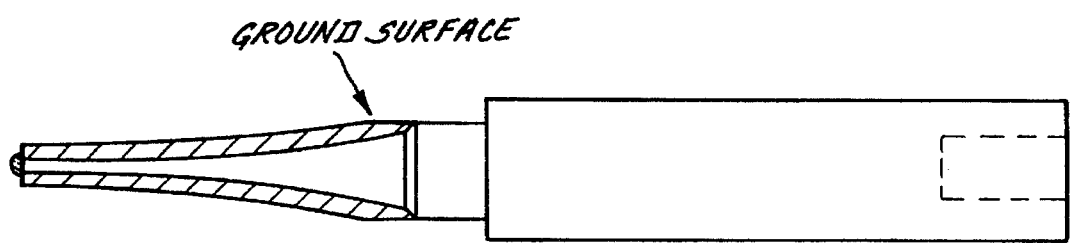
FIG. 14c illustrates a nonimaging optical mandrel fabrication step of grinding an outside diameter to trim excess material.
Figure 14D:
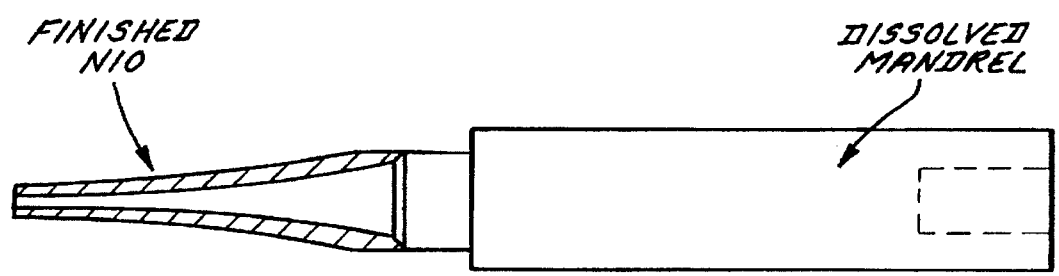
FIG. 14d illustrates a nonimaging optical mandrel fabrication step of dissolving away the sacrificial mandrel according to the present invention.

In order to understand the design of an nonimaging optical transformer, the design of a compound parabolic concentrator (CPC) is presented. (The CPC was first proposed by Roland Winston of the University of Chicago.)[2] FIG. 13 shows a CPC and its associated rays. In an optimal concentrator, all the rays entering the device exit within a cone of $\pi/2$ radians. As seen in FIG. 13, a compound parabolic structure is designed by using portions of a parabola whose axis is parallel to the direction of the maximal rays ($\theta_1$) entering the element. The focus of the parabola is placed on the edge of the exit aperture. The design relies on the edge ray principle if all the maximal rays entering the nonimaging optical are collected (and exit in $\pi/2$ radians) then all the rays entering at smaller angles will be collected also. Each ray only undergoes one reflection through the nonimaging optical (in two dimensions). By so designing this element, the element becomes a perfect two dimensional Liouville concentrator, since the element conserves the Liouville invariant.

Any ray entering the nonimaging optical at angles greater than the maximal angle will be reflected out the entrance aperture. This can be seen by simple ray tracing. One important design parameter for the nonimaging optical elements is the length necessary to attain optimal concentration. It is driven by the maximal angle and the radii of the entrance and exit apertures, $R_{ent}$ and $R_{exit}$. The maximal ray that passes the edge of the entrance aperture reflects from the edge of the exit aperture to give $$L_{NIO}=(R_{ent}+R_{exit}) \cot \theta_1. \quad (7)$$

As discussed below, length considerations are the primary driver for the nonimaging optical designs for use with the disclosed invention.

The perfect concentration properties of these nonimaging optical elements are compromised when the two dimensional design is rotated about its axis of symmetry. In such a case, skew rays entering the nonimaging optical will undergo more than one reflection before exiting the aperture. In fact, some skew rays will be reflected back out the entrance aperture, depending on where they enter the nonimaging optical and how close to the maximal acceptance angle they are. However, the main effect is typically a slight decrease in the sharpness of the field of view (FOV) of the nonimaging optical and an increase in the number of reflections that occur before a skew ray is collected. These issues and the effect they have on the FOV of the nonimaging optical elements designed for the collector array will be discussed further.

For fiber optic applications, nonimaging optical elements must be designed as numerical aperture transformers rather than concentrators. The design of transformers is similar to that of concentrators using the edge ray principle. However, it is easier to understand the transformer design by starting at the exit aperture. The constraint is that all the rays entering the nonimaging optical exit aperture at an angle $\theta_0$ exit the entrance aperture at the maximal angle $\theta_1$ (FIG. 13). The angle $\theta_0$ is dictated by the numerical aperture (NA) of the optical fiber by the relation NA=$\sin \theta_0$. For the CPC design, this dictates that the surface of the nonimaging optical between the associated maximal rays at the fiber input end must be a cone. The conical section changes to a standard CPC section described in the previous section, as shown in FIG. 13. As a result, all rays entering the nonimaging optical from the large end of the transformer within the acceptance angle $\theta_1$ will be transformed into the acceptance angle $\theta_0$ of the optical fiber that is connected to the nonimaging optical.

The fabrication of nonimaging optical elements will now be described. The main steps in the fabrication of an nonimaging optical element are briefly described below. A hollow reflective element with the desired surface profile is produced through electroforming. FIGS. 14a–14d illustrate the fabrication process, from the sacrificial aluminum mandrel to the finished nonimaging optical piece. By using this mandrel design with a small shoulder at the surface/mandrel edge, a single grinding step trims the nonimaging optical to the desired length and turns the outside diameter for insertion into the array housing. This is also done so that the diamond turning step starts at a cylindrical surface and does not have to cut small corners. The small end length does not require post machining, since the small end length is masked during the electroforming process to prevent deposition on the end.

The nonimaging optical element must be pigtailed to an SMA connectorized optical fiber. This requires inserting the fiber into the nonimaging optical electroform and epoxying and strain relieving the fiber to the nonimaging optical.

Figure 15:
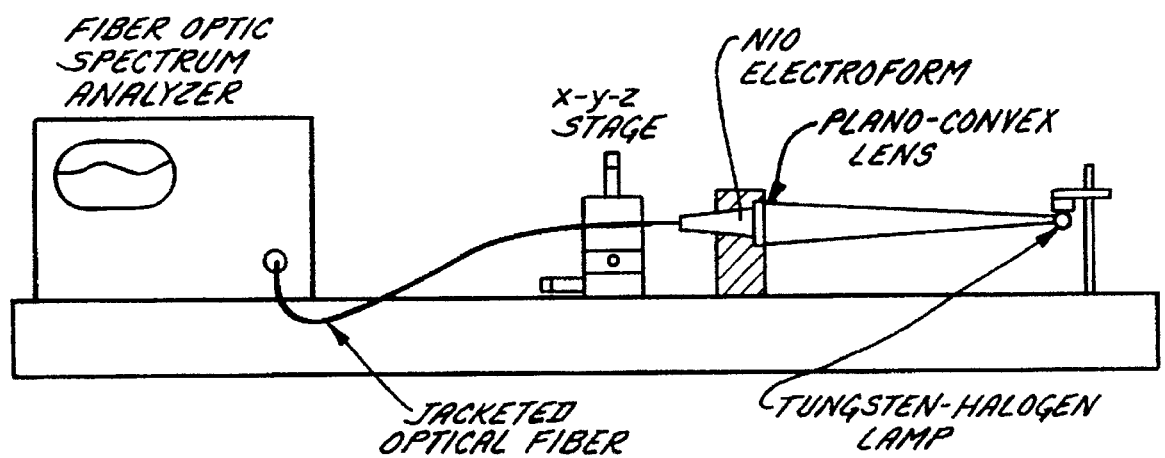
FIG. 15 illustrates a schematic diagram of an optical pigtailing apparatus according to the present invention.

FIG. 15 shows the apparatus that is used to perform the pigtailing. A special mounting fixture has been designed to house the nonimaging optical and a plano-sherical convex lens. The combination of these components results in an optical element that promises the highest efficiency possible for light collection with an acceptance half-angle of 0.5°. A tungsten-halogen lamp is mounted on the optical breadboard at a distance (roughly 35 cm) such that the cone of rays striking the entrance aperture of the nonimaging optical would have a half-angle of 0.5°. The optical fiber is then inserted into the nonimaging optical electroform using a precision x-y-z stage. A fiber optic spectrum analyzer is used to monitor the collection efficiency of the nonimaging optical element. The fiber is inserted into the nonimaging optical for maximum signal collected from the source. Once aligned, the fiber is epoxied into place and strain relieved inside the nonimaging optical.

The nonimaging optical technology described above is applicable to light pipes. For a single optical fiber AR-120 (NA=0.47) a cone transformer can be designed to transform this numerical aperture to a value of 0.087, which correspond to the output light distribution in a 10° full angle cone.

2. Holographic Diffusers

Light-beam shaping can utilize volume holography to scatter incident light into a controlled angular pattern with little variation in light intensity. This method of controlled diffusion can achieve structureless illumination patterns much more easily than conventional reflectors and mirrors and at lower manufacturing costs. Aside from small-area illumination by spotlights and search lights, most illumination tasks involve spreading lighting to a moderate angle, usually between 1° and 70°, for collimated incident light. Holographic diffusers can scatter light into such a pattern, while conventional diffusers, such as ordinary frosted glass, are only capable of scattering lighting into a hemispherical pattern. Conventional diffusers commonly rely on surface roughness, a microscale irregularity that is difficult to control. Thus, a designer has little ability to specify a particular scattering pattern. Producing controlled scattering can employ a thin volume hologram which has variations in its index of refraction throughout the media. These variations in the index of refraction in the volume hologram can be tailored so that the resulting scattering pattern can take a variety of shapes and give the source a glare-free appearance.

Figure 16C:
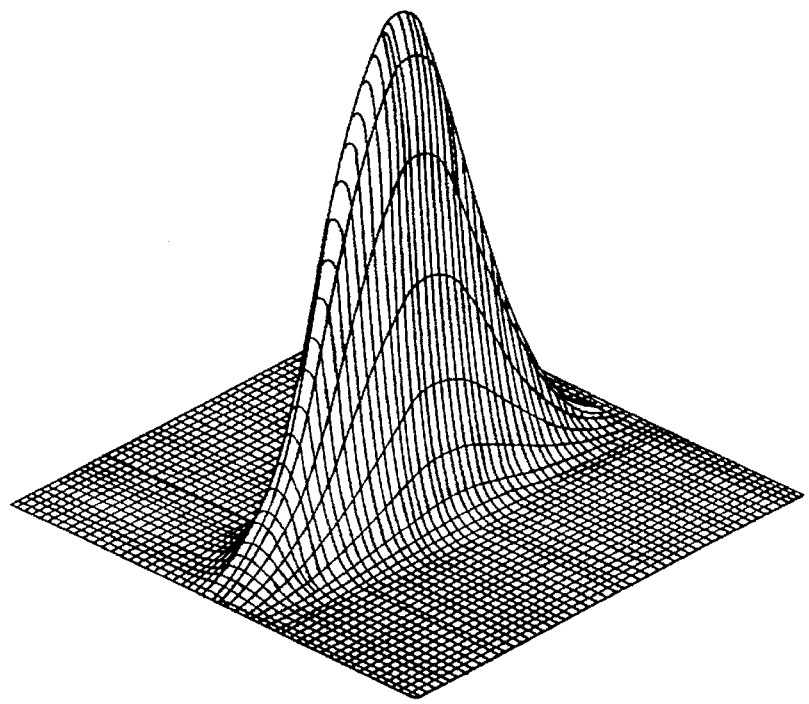
FIG. 16c illustrates a three-dimensional perspective view of an output profile of the elliptical holographic diffuser characterized in FIGS. 16a and 16b.
Figure 16A:
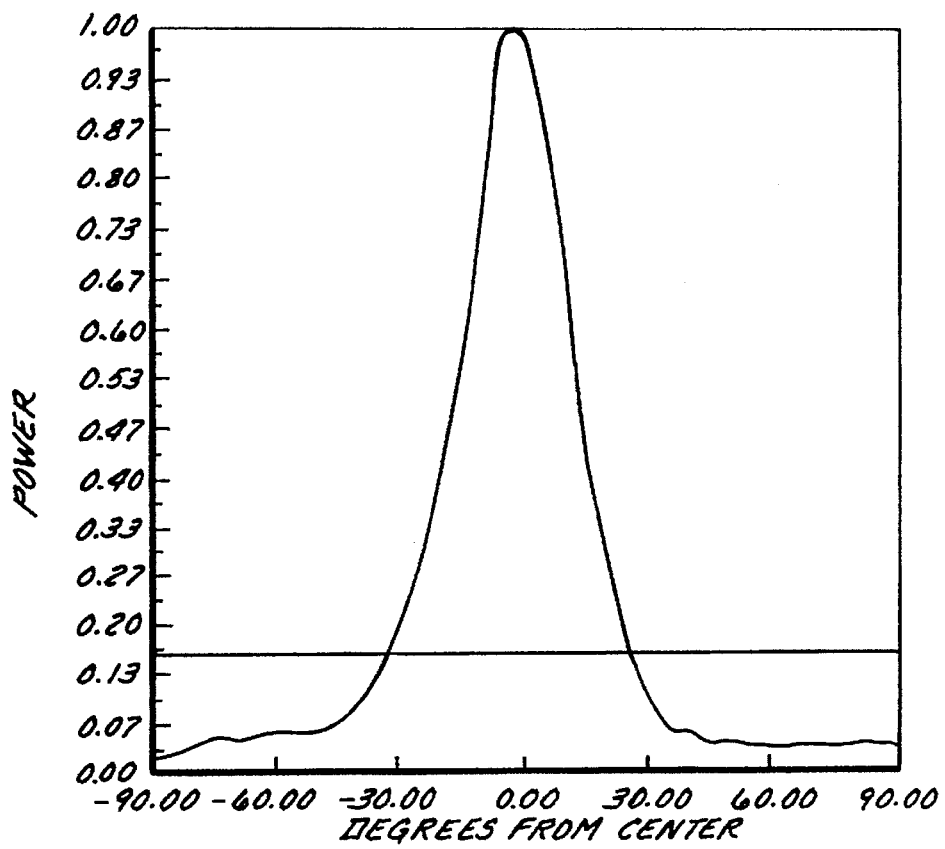
FIG. 16a illustrates a trace of power as a function of degrees from center for a first orthogonal axis of a elliptical holographic diffuser according to the present invention.
Figure 16B:
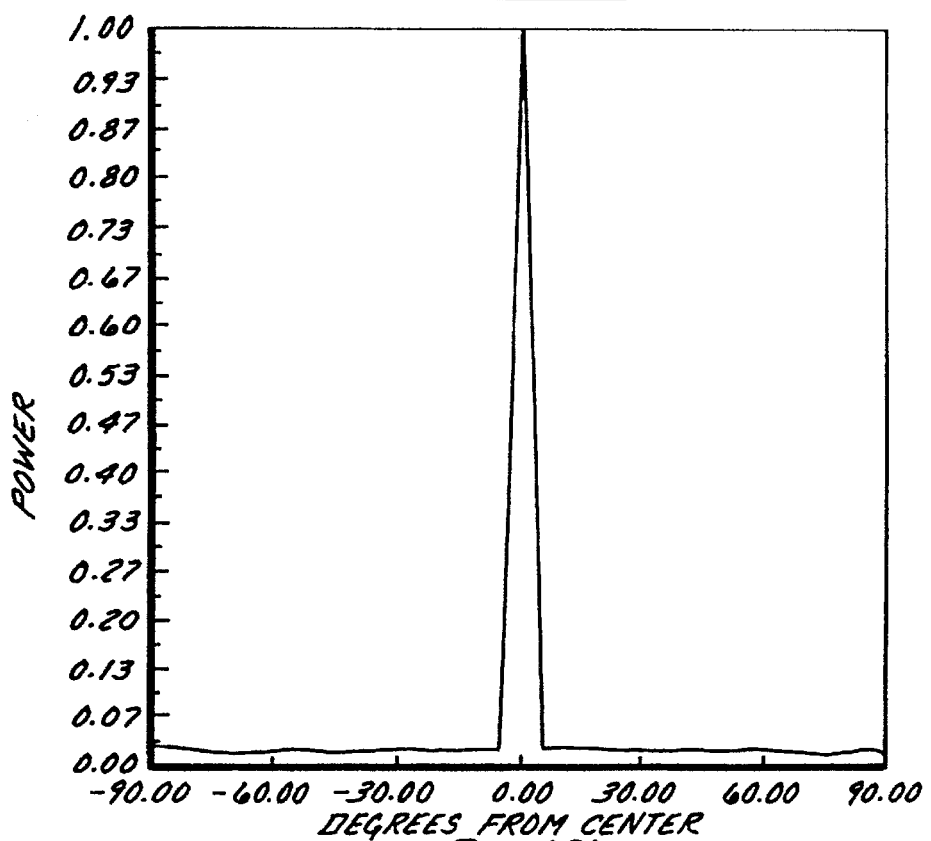

FIGS. 16a–16c show the characteristics of a narrow elliptical holographic diffuser. The advantages of the new technique are that it can produce a custom shaped beam, has low insertion loss, and is low-cost. Holographic diffusers are perfect for shaping the navigation light beam in the mast luminair.

An additional component that can be included in the beamformer is a color filter. Color filters can be optically coupled to the holographic diffusers, or to the light transformers. In addition to the normal visible spectrum filters, filters that permit the passage of electromagnetic radiation in nonvisible portions of the spectrum can be attached to the diffusers, if a particular remote lighting application warrants the use of such filters.

In addition to the volumetric holographic diffusers disclosed in U.S. Pat. No. 5,365,354, the present invention can also use holographic surface relief diffusers. These surface relief diffusers can be fabricated by etching material away from the above described volumetric diffusers or exposing such volumetric diffusers to a swelling process to create the surface relief. The surface relief diffusers can then be replicated in a metal master that is used to impress the surface relief onto the surface of the beam transformer so as to provide the surface relief directly on a surface of the beam transformer. Alternatively, the surface relief can be rendered inside a mold cavity such that one of the internal surfaces of the mold cavity presents a replica of the surface relief. Upon injection molding, the master surface relief is replicated directly on the surface of the beam transformer. These processes can be used to design and fabricate holographic diffuses that spread light into a pattern specified by COL-REG and UL-1104 standards.

Although the present invention is fully suitable for use with a single beamformer, or multiple beamformers located at multiple remote locations, the present invention can also be used with multiple beamformers located at a single location. In this latter case, the structural combination of multiple beamformers at a single site can be described as a luminair. In addition to the case where a luminair includes multiple discrete beamformers, a luminair can include multiple diffusers and a single light transformer where the multiple diffusers receive light from the single light transformer. Further, a luminair can include a single holographic diffuser that receives light from a multiplicity of light transformers. Furthermore, a luminair can include a multiplicity of any of the above-described combinations. In addition, luminairs can be provided with one or more color filters that are optically connected to the one or more diffusers, or to the one or more light transformers.

III. Detailed Description of Universal Remote Lighting System Power Budget

Figure 17:
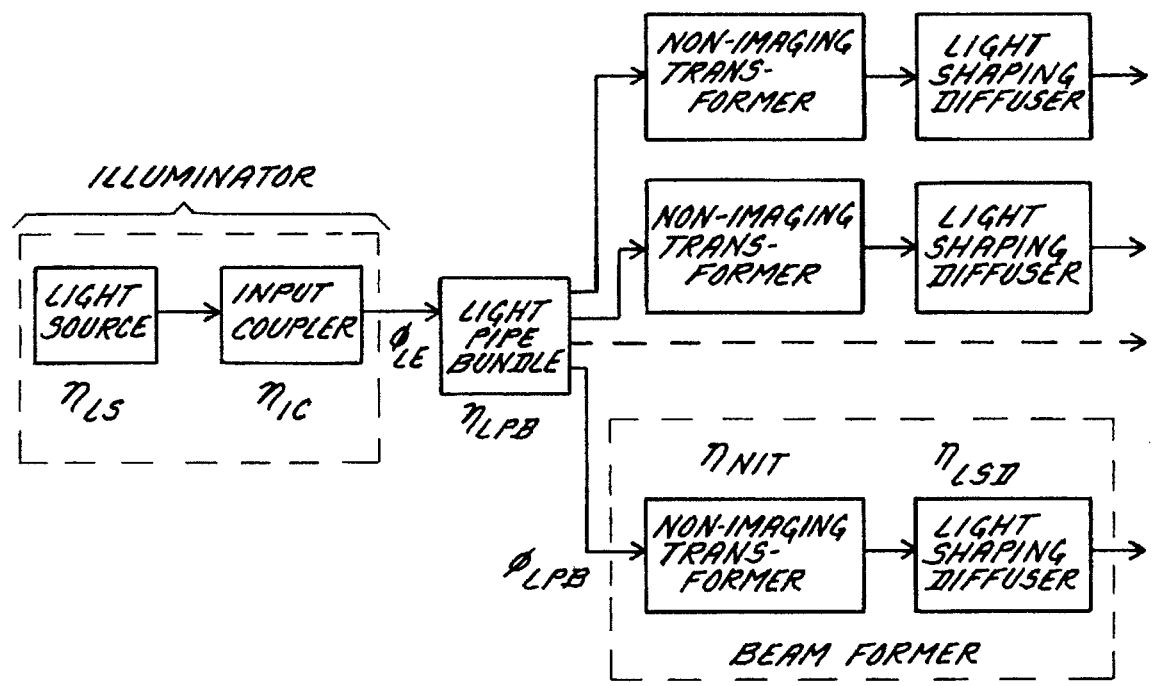
FIG. 17 illustrates a block diagram of a universal remote lighting system according to the present invention.

A block diagram of the universal remote lighting system is shown in FIG. 17. The universal remote lighting system is structured for maximum design flexibility. It allows the designer to respond to system requirements by incorporating into the design several light pipe branches, which can have unequal power distribution and a variety of formed light patterns. In other words, one illuminator can be used to serve several lighting points which need not be the same in brightness or pattern.

The relation between the input and the output power for each k-th element of the system is $$P_{k\,out} = \eta_k \cdot P_{k\,in}, \quad (8)$$

where $P_{k\,out}$ is the input power, $P_{k\,out}$ is the output power and $\eta_k$ is the efficiency of the k-th element.

The following equations define the basic relations determining the system power budget in photometric quantities and units.

Illuminator Efficiency:

$$\eta_{LE} = \eta_{LS} \cdot \eta_{IC} = \Phi_{LE}/\Phi_{LS}, \quad (9)$$

where $\eta_{LS}$ is the light source efficiency (useful outgoing percentage of the total luminous flux $\Phi_{LS}$ generated by the light source), $\eta_{IC}$ is the input coupler efficiency, and $\Phi_{LE}$ is the luminous flux on the illuminator output (or, equivalently, on the light pipe bundle input). Total luminous flux of the light source can be determined by $$\Phi_{LS} = E P_{LS}, \quad (10)$$

where E is light source efficacy in lumens/watt, and $P_{LS}$ is the electrical power of the light source in watts.

Light Pipe Bundle Efficiency:

$$\eta_{LPB} = \frac{\sum_{i=1}^{N} \Phi_{iLPB}}{\Phi_{LE}} \quad (11)$$

where N is the number of branches in the light pipe bundle, $\Phi_{iLPB}$ is the luminous flux on the i-th branch output, and $$\Phi_{iLPB} = \Phi_{LE} \cdot l_i \cdot B, \quad (12)$$

$k_i$ is that portion of the luminous flux which is in the i-th branch $$\left( \sum_{i=1}^{N} k_i = 1 \right),$$

$l_i$ is the branch length, and B is light pipe attenuation per length.

Beamformer Efficiency:

$$\eta_{iBF} = \eta_{iNIT} \cdot \eta_{iLSD} = \Phi_{i\,out}/\Phi_{iLPB}. \quad (13)$$

Here $\eta_{i\,NIT}$ is the light transformer efficiency, $\eta_{i\,LSD}$ is the light shaping diffuser efficiency and $\Phi_{i\,out}$ is the outgoing luminous flux in i-th light point.

Total System Efficiency:

$$\eta = \frac{\sum_{i=1}^{N} \Phi_{iout}}{\Phi_{LS}} \quad (14)$$

or, substituting Eqs. (10), (11), (12) and (13) in Eq. (14), $$\eta = \eta_{LS} \cdot \eta_{IC} \cdot \sum_{i=1}^{N} k_i \cdot l_i \cdot B \cdot \eta_{iNIT} \cdot \eta_{iLSD} \quad (15)$$

EXAMPLES

Specific embodiments of the present invention will now be further described by the following, nonlimiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Nonimaging Light Transformer

A nonimaging light transformer (LT) for use in the remote source with direct optical monitoring approach lighting system can be quite small and efficient. Since this component is crucial to optimizing the light output, and five light transformers are included on each light bar, the compact size will contribute significantly to the reduction in weight and volume (bulkiness) of the resulting remote source with direct optical monitoring approach lighting system. This section considers a series of approaches to designing a light transformer. We first consider a purely parabolic configuration, which leads to a transformer that is unacceptably long. Next we consider a hybrid parabolic-hyperbolic transformer, whose length is very short.

Figure 18:
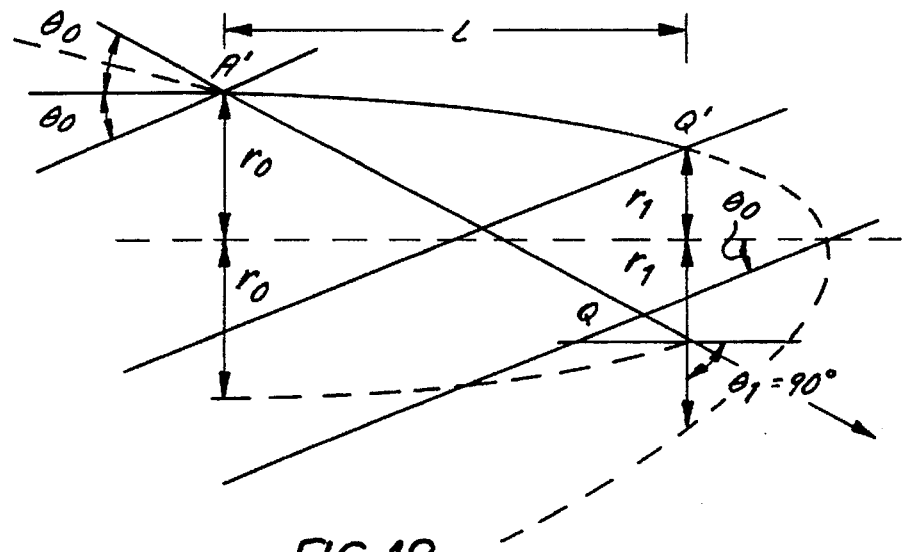
FIG. 18, illustrates the edge-ray principle.

The purpose of the light transformer is to match an entrance aperture (for example, an optical fiber) to an exit aperture with maximally uniform output brightness at all exit angles. Since ray tracing is reversible, we can treat the problem as one of designing a nonimaging concentrator (NC). That problem consists of transforming a diverging beam with a small angle of divergence $\theta_o$ incident on an entrance area $S_o$ of radius $r_o$ into a beam with a minimal exit area $S_1$ and radius $r_1$. The Langrange invariant governs this relationship:

$$r_o \sin\theta_o = r_1 \sin\theta_1, \quad (16)$$

where $\theta_1$ is the exit divergence angle. The concentration ratio $r_o/r_1$ is at its maximum when $\theta_1$ is at its maximum, 90°, and $\sin \theta_1 = 1$. Taking advantage of the characteristics of nonimaging optics, we decided to use edge-ray design principles[2], in which a perfect image is produced only at the edges of the exit aperture, as illustrated in FIG. 18. Q indicates the edge of the exit aperture.

In a compound parabolic concentrator (CPC) the curve between points A' and Q' is a parabola with its focus at point Q. It is not difficult to show that the length L of the light transformer must be $$L = r_1(1+\sin\theta_o) \cos\theta_o / \sin^2\theta_o, \quad (17)$$

Figure 19:
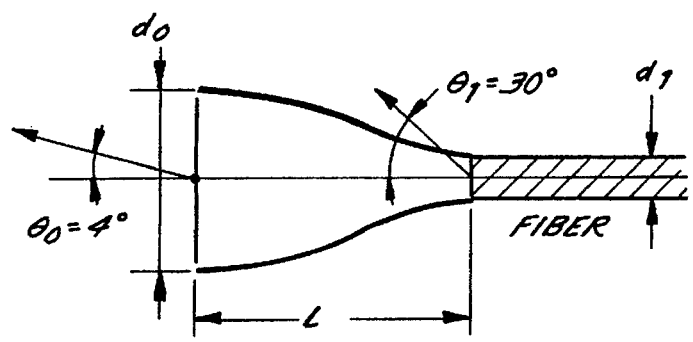
FIG. 19 illustrates a schematic view of a light transformer according to the present invention.

Recall that the source of the light entering the light transformer is a fiber with an exit aperture $\theta_1 = 30°$. To obtain light output that meets FAA and ICAO regulations, out purpose is to design a light transformer such that the exit aperture half angle $\theta_o = 4°$, as shown in FIG. 19.

It follows from Eq. (17) that the length L of CPC light transformers with fiber diameters $d_1$ would be as shown in Table 4.

TABLE 4

Length of CPC Light Transformers for Various Entrance and Exit Diameters

| $d_1$ (mm) | $\theta_1$ (°) | $d_o$ (mm) | $\theta_o$ (°) | L (mm) |
| --- | --- | --- | --- | --- |
| 7 | 30 | 52.5 | 4 | 445 |
| 9 | 30 | 67.5 | 4 | 572 |
| 11 | 30 | 82.5 | 4 | 699 |

Table 4 shows that these CPC light transformers would be disadvantageously long. The CPC device discussed in the preceding paragraphs has a maximum concentration ratio of $d_o/d_1$ and an exit angle of 90°, whereas our actual fiber has an acceptance angle of only 30° (FIG. 19). Clearly, another approach is necessary.

Figure 20:
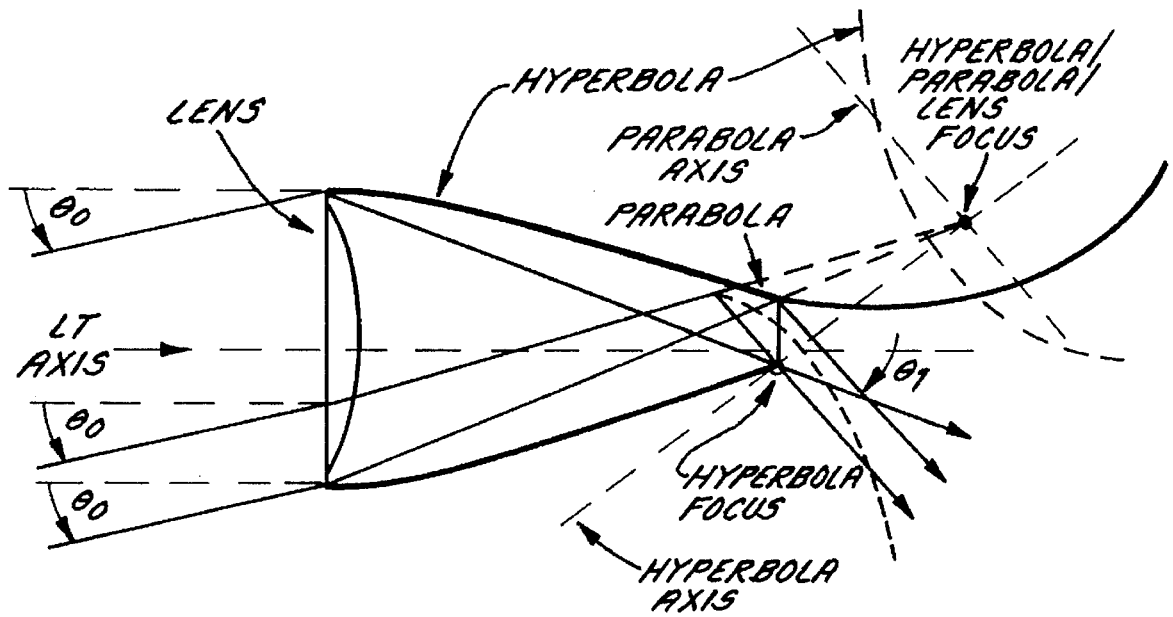
FIG. 20 illustrates a schematic view of a quasi-hyperbolic/parabolic transformer (QHP) design showing multiple surface profile components according to the present invention.

Incorporating a refractive lens at the exit of the light transformer is shown in FIG. 20. The constraint is that a ray that enters the light transformer at an angle $\leq \theta_1$ must exit the light transformer at an angle $\leq \theta_o$. Angle $\theta_1$ is dictated by the numerical aperture (N/A) of the optical fiber, such that $NA = \sin\theta_1$. For a quasi-hyperbolic/parabolic transformer (QHP) design, this dictates that the surface of the light transformer defining the edge rays at the fiber end must be a parabola. These rays are reflected through the focus of the parabolic section. The parabolic section merges into a hyperbolic section which has one focus coincident with the focus of the parabola and the other at the edge of the fiber input aperture, as shown in FIG. 20. The diameters of the input and output apertures of the QHP morphology are still related by the Langrange invariant, Eq. (16). Constraining the lens focal length f such that the edge rays focus at the common hyperbola/parabola focus gives us a light transformer with the same optical properties as the one in the previously discussed CPC optics. The critical difference is that now the length of the light transformer is L is approximately equal to f.

Table 5 provides several examples of minimum light transformer length with an entrance angle of 30° and an exit angle of 4°.

TABLE 5

Comparison of the Lengths of CPC Light Transformers to the Lengths of Light Transformers with Lenses for Various Entrance and Exit Diameters

| Entrance Diameter (mm) | Exit Diameter (mm) | f Lens (mm) | Length of CPC Light Transformer (mm) | Length of Light Transformer with Lens (mm) |
| --- | --- | --- | --- | --- |
| 7 | 52.5 | 103 | 445 | 80 |
| 9 | 67.5 | 125 | 572 | 100 |
| 11 | 82.5 | 162 | 699 | 130 |

Table 5 shows a significant shortening of the light transformer in comparison with a CPC device. This resulting light transformer will be quire short, yielding a very light weight and compact device for use in our light transformer system.

Holographic Diffuser

As noted above, a new method of beam shaping uses a volume hologram to scatter incident light into a controlled angular pattern. This new method of producing controlled scattering employs a thin volume hologram whose index of refraction varies within the medium. By tailoring this variation, we can produce a glare-free pattern in a variety of shapes.

The advantages of this new technique are that is can produce a custom shaped beam, it has low insertion loss, and it is low in cost. Holographic diffusers are perfectly suited for shaping the light beam in accordance with ICAO requirements.

Figure 21A:
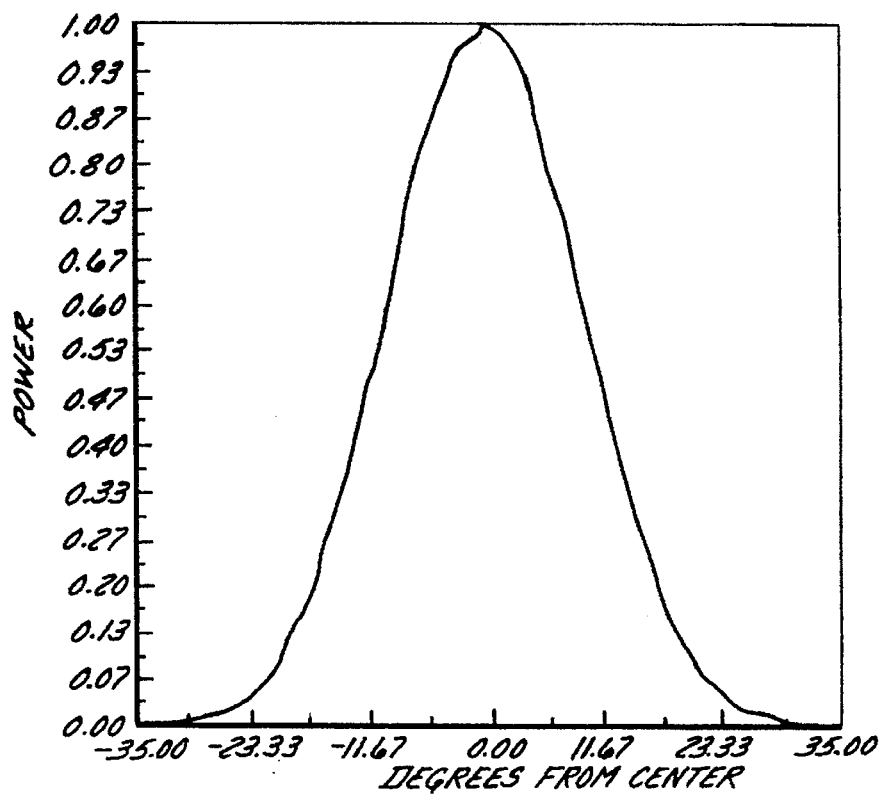
FIG. 21a illustrates a goniometer scan of the X axis of the scatter pattern of a holographic diffuser for an approach lighting system according to the present invention.
Figure 21B:
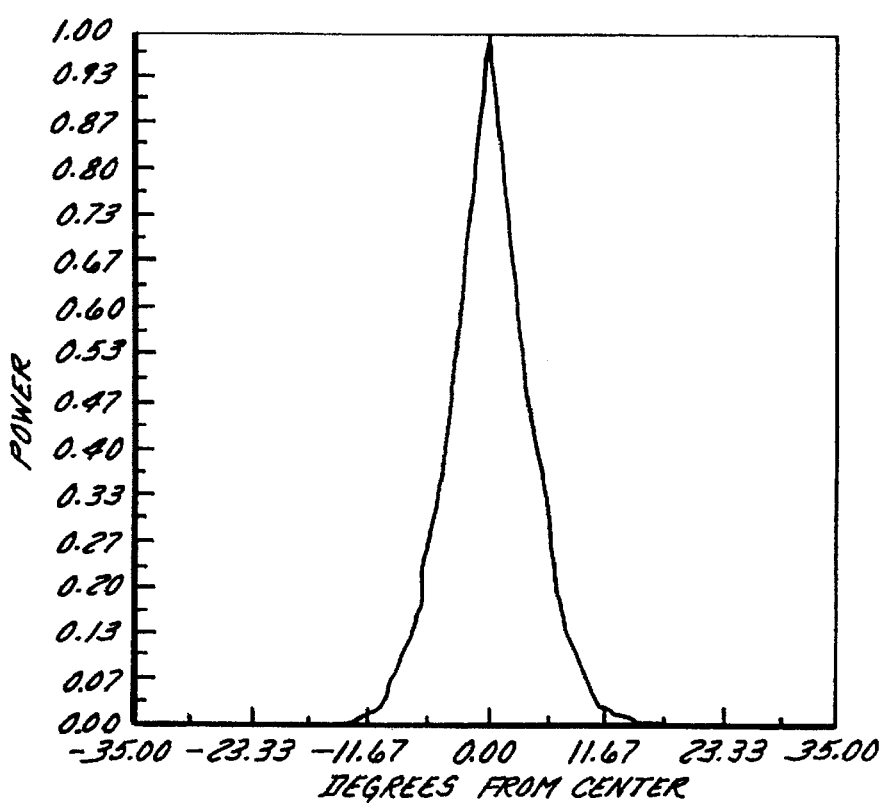

To meet ICAO requirements for the ALSF-2 light pattern, a holographic elliptical diffuser can be used in the beamformer and be combined with a specially designed light transformer. FIGS. 21a and 21b show the performance of such a diffuser. An elliptical (28°×8°) light pattern produced by a corresponding beamformer meets ICAO requirements.

In contrast to presently used ALSF-2 light towers, and even to fragile structures (FAA specification FAA-E-2491 and FAA-E-2702), the remote source with direct optical monitoring approach lighting system will be very light weight. The total weight of 5 luminaries can be less than 5 pounds. Therefore, the design of the light tower support will be driven only by environmental requirements (wind resistance, snow, rain, etc.). In addition, because there are no electrical wires or connectors on the full length of the light tower, the likelihood of electrically ignited fire resulting from impact is reduced to near zero.

In the remote source with direct optical monitoring approach lighting system, two brightness control methods will be used: first, an indirect method similar to that currently used in the ALSF-2 to control the level of power to the illuminator; and second, a direct monitoring control of the optical output of each lamp, through the use of feedback loops. This system uses indirect control for the coarse selection of the brightness level, and direct optical monitoring for fine automatic adjustment to regulate the brightness of the light source.

Figure 22A:
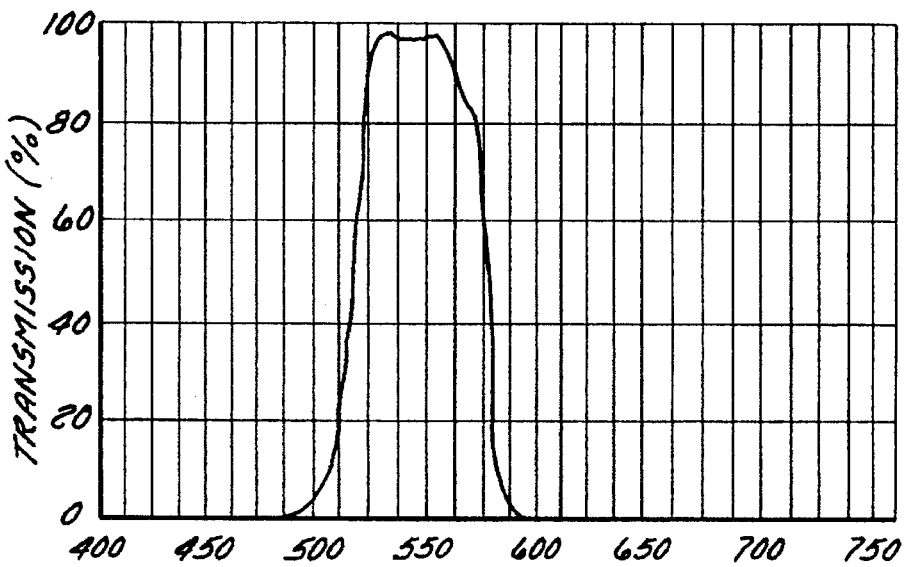
FIG. 22a, illustrates a trace of transmittance as a function of wavelength for a green Blazer's dichroic filter according to the present invention.
Figure 22B:
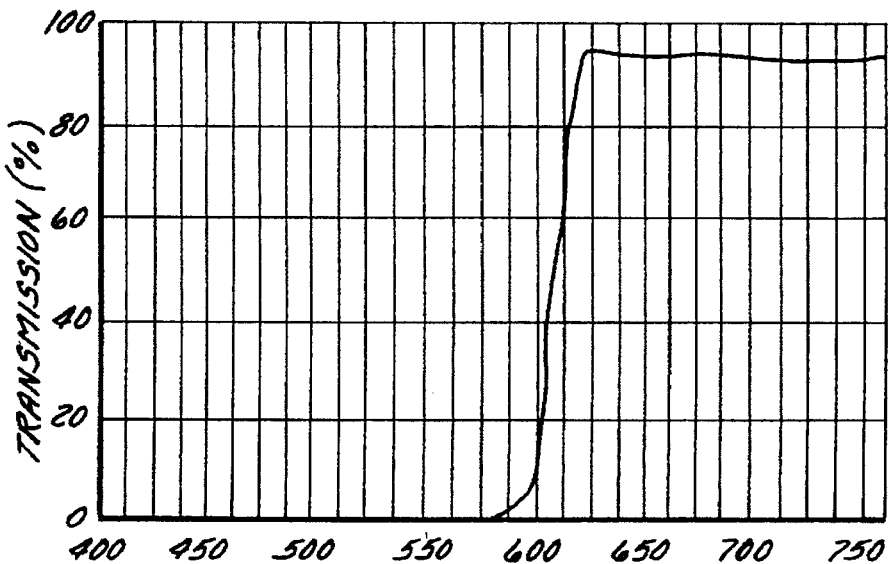
FIG. 22b, illustrates a trace of transmittance as a function of wavelength for a red Blazer's dichroic filter according to the present invention.
Figure 27A:
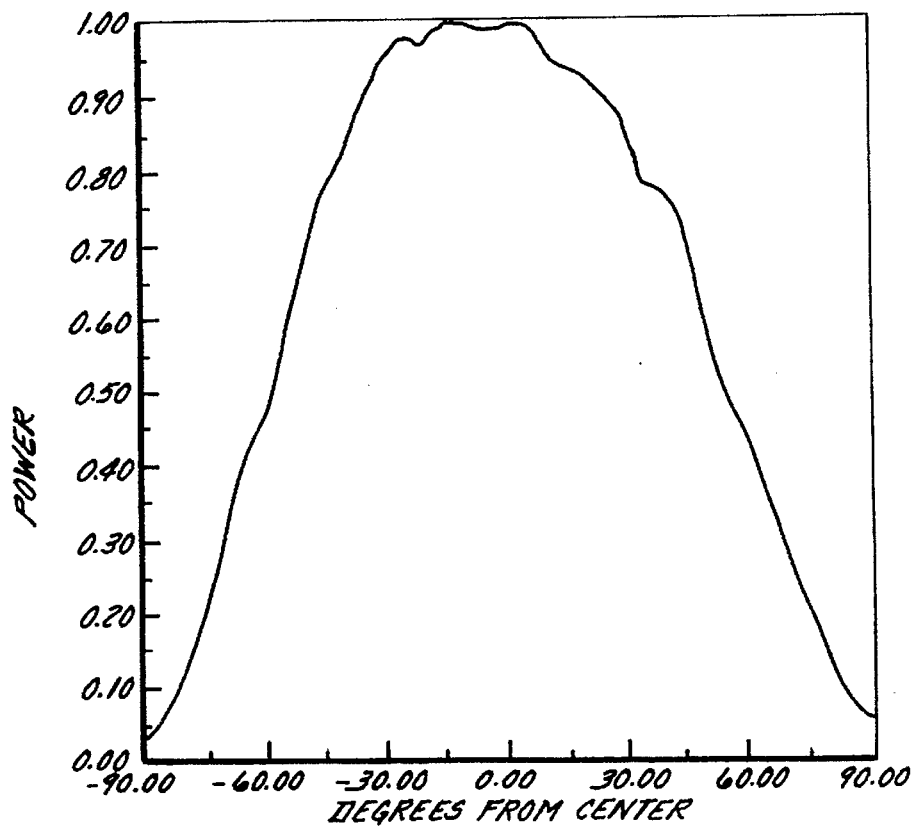
FIG. 27a illustrates a goniometer scan of an X-axis scatter pattern from an elliptical light shaping diffuser according to the present invention.
Figure 27B:
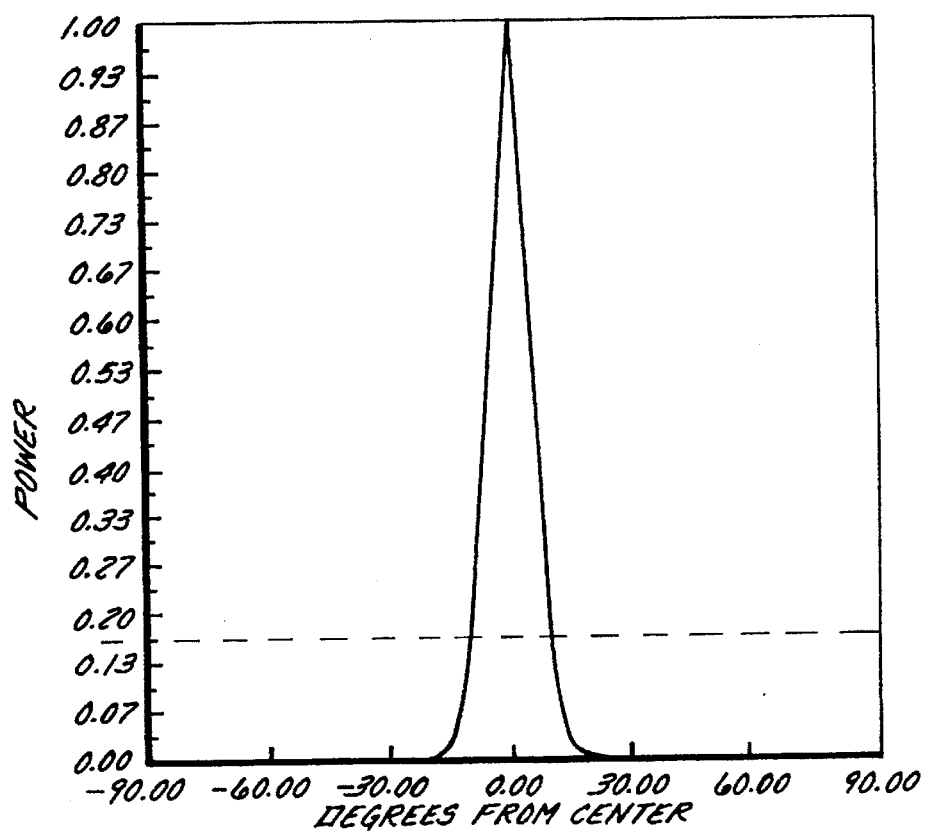

According to FAA-E-2689a, two colored lights should be used in the ALSF-2: a green for threshold bar illumination and a red for the side three light bars, located between the 1000 ft bar and the threshold bar. The simplest way to produce colored light is to use colored filters. It is not critical wherein the system the filter is installed. The location can be determined in the course of system design. Sample spectra of both red and green Blazer dichroic color filters are shown in FIGS. 22A and 22B.

The power budget for the colored lights can be determined by the spectral distribution of energy generated by the light source in the visible range of the optical spectrum. Currently used high power light sources have different spectral distribution of energy. Approximately 25 to 35% of the total energy produced in the visible portion of the spectrum is located in the green or red portion. This energy distribution should be taken into account in power budget calculations and should be reflected in the illuminator design.

According to International and Inland Rules formalized in the Convention on the International Regulation for Preventing Collision at Sea (COLREGS)[3] and Standard UL-1104 for Marine Navigation Lights[4], a masthead light must satisfy the requirements in Table 6.

TABLE 6

Masthead Light Requirements

| Color | White |
| --- | --- |
| Horizontal Beam Spread | Unbroken arc of 225° symmetrical to forward direction, with +5° each side permissible spillover (⅛ of required minimum intensity) |
| Vertical Beam Spread | from 5° above to 5° below the horizontal and 60% of required minimum intensity from 7.5° above to 7.5° below the horizontal |
| Visibility of Light | 6 nautical miles |
| Minimum Luminous Intensity | 94 candelas (at 6 miles visibility and atmospheric transmission K = 0.8) |
| Vertical Positioning | Height above the hull up to 12 m |

Figure 25:
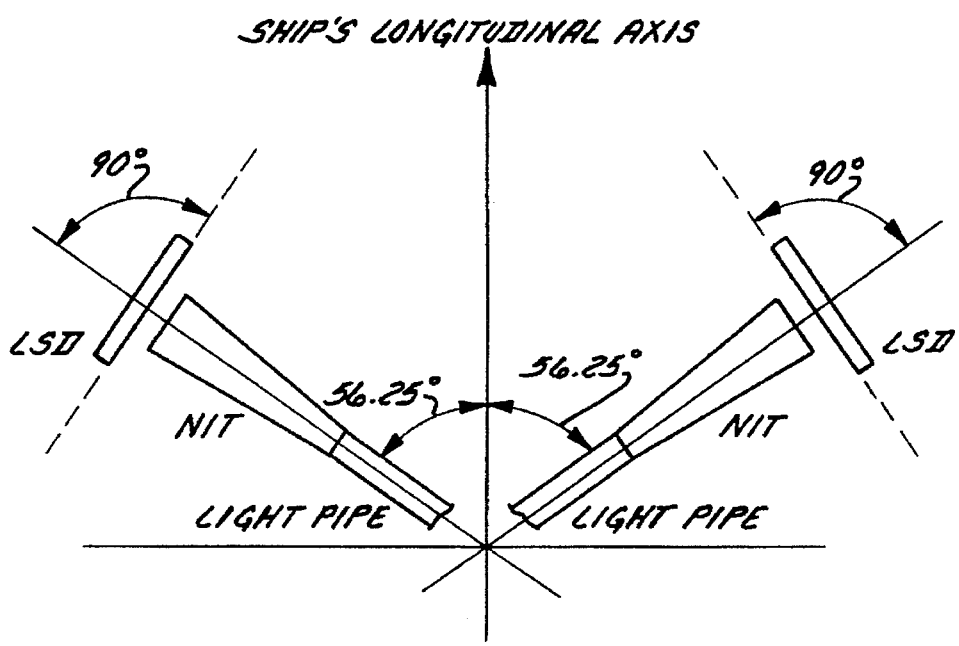
FIG. 25 illustrates a mast head light design using two light shaping diffusers with a 112.5° light pattern in the horizontal plane according to the present invention.

The horizontal beam spread of the masthead light is shown in FIG. 23. the field of view of a masthead light, according to the requirements, is 225°, so (because it exceeds 180°) two beamformers will be used. The simplest way to compose this light pattern is to use a symmetrical design of two similar beamformers each with a 112.5° horizontal pattern. The pattern is shown in FIGS. 24A–24B and the masthead light design in FIG. 25.

The requirements specify a minimum luminous intensity, $Imin_1$, across the light pattern of not less than 94 candelas (at 6 nautical miles visibility and standard atmospheric transmission).

The solid angle of light distribution is $$\theta_1 = \alpha_1 \beta_1 = 3.927 \times 1.02 \text{ steradian,} \quad (18)$$

where $\alpha_1 = 225°$ is the horizontal pattern angle and $\beta_1 = 15°$ is the vertical pattern angle.

Minimum luminous flux $$\Phi min_1 = Imin_1 \cdot \theta_1 = 94 \text{ cd} \cdot 1.02 \text{ steradian} = 96 \text{ lumens} \quad (19)$$

The total system efficiency $\eta$ can be calculated using Eq. 15. Assume that $\eta_{LE} = \eta_{LS} \eta_{IC} = 0.8$, N=2, $K_1 = K_2 = 0.5$, $l_1 = l_2 = 15$ m, B=100 dB/km, $\eta_{NTT} = 0.85$, NS $\eta$hd LSD=0.9. Substituting these numbers into Eq. (4–8) yields a total systems efficiency of $\eta_1 = 0.428$. The minimum required luminous flux generated by a light source from Eq. (4–7) is $\Phi_{LSmin1} = \Phi_{min1}/\eta_1 = 96/0.428 = 224.3$ lumens, which means that, when using an XMH-60 arc lamp (2000 lumens) as a light source, only approximately one tenth of the generated light is needed to provide the minimum required luminous flux in the masthead light pattern.

The red all-around warning light design requirements include the current COLREGS and other official regulations (MIL-L-24650 (SH) with Supplement 1B (17 Aug. 1990) and Amendment A (17 Aug. 1990)) spell out the requirements displayed in Table 7.

TABLE 7

Requirements for the Red All-Around Warning Light

| Color | Red |
| --- | --- |
| Horizontal Beam Spread | Unbroken arc of 360° |
| Vertical Beam Spread | From 5° above to 5° below the horizontal and 60% of required minimum intensity from 7.5° to 7.5° below the horizontal |
| Visibility of Light | 3 nautical miles |
| Minimum Luminous Intensity | 12 candelas (at 3 miles visibility and standard atmospheric transmission K = 0.8) |
| Vertical Positioning | Height up to 30 m |

Figure 26:
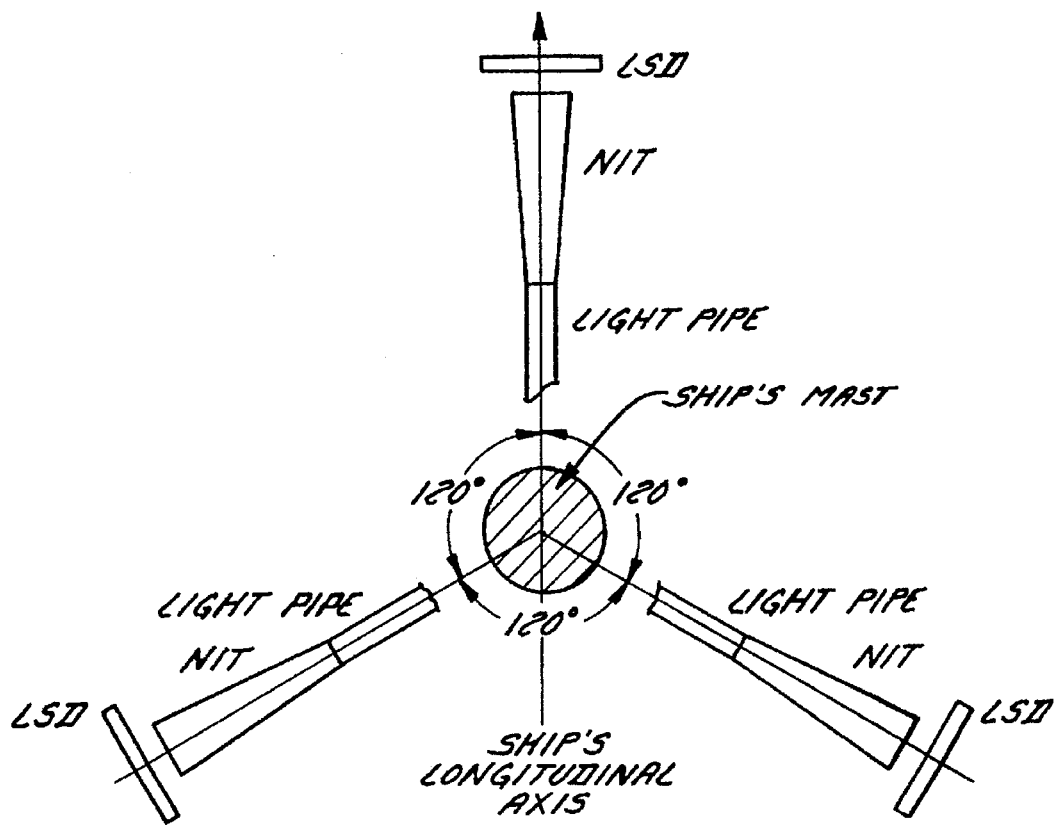
FIG. 26 illustrates an all-around warning light design, using three light shaping diffusers having a 120° light pattern in the horizontal plane, according to the present invention.

To form an all-around beam pattern, three identical beamformers, each with 120° beam spread diagram, can be composed (see FIG. 26). According to the requirements, the minimum luminous intensity $I_{min2} \geq 12$ cd at a visibility of three nautical miles and standard atmospheric transmission. The solid angle of light distribution is $$\theta_2 = \alpha_2 \cdot \beta_2 = 6.283 \times 0.26 = 1.63 \text{ steradian,} \quad (20)$$

where $\alpha_2 = 360°$ horizontal pattern angle and $\beta_2 = 15°$ vertical pattern angle.

The minimum luminous flux $\Phi_{min2}$ required to provide luminous intensity $I_{min2}$ is $$\Phi_{min2} = I_{min2} \cdot \theta_2 = 12 \text{ cd} \cdot 1.63 \text{ steradian} = 19.6 \text{ lumens.} \quad (21)$$

Assume that $\eta_{LE} = \eta_{LS} \eta_{IC} = 0.8$, N=3, $K_1 = K_2 = K_3 = 0.333$, $l_1 = l_2 = l_3 = 120' = 36.57$ m, B=100 dB/km, $\eta_{NTT} = 0.5$, then $\eta_{LSD} = 0.9$ and total system efficiency is $\eta_2 = 0.27$. The minimum required luminous flux from the light source is $$\Phi_{LSmin2} = \Phi_{min2}/\eta_n = 19.6/0.27 = 72.6 \text{ lumens.} \quad (22)$$

This power budget was calculated for a white light pattern. To produce red light, a red filter should be used in the system. Where the filter is installed is not critical, but the fact that plastic light pipe usually has its greatest attenuation in the red region of the visible spectrum argues for putting the red filter in the beamformer. For example, Balzer's dichroic color filter DT Red (see FIG. 22B) will transmit 95% of light source energy generated in the red region of the visible spectrum (600 nm to 750 nm).

Figure 28:
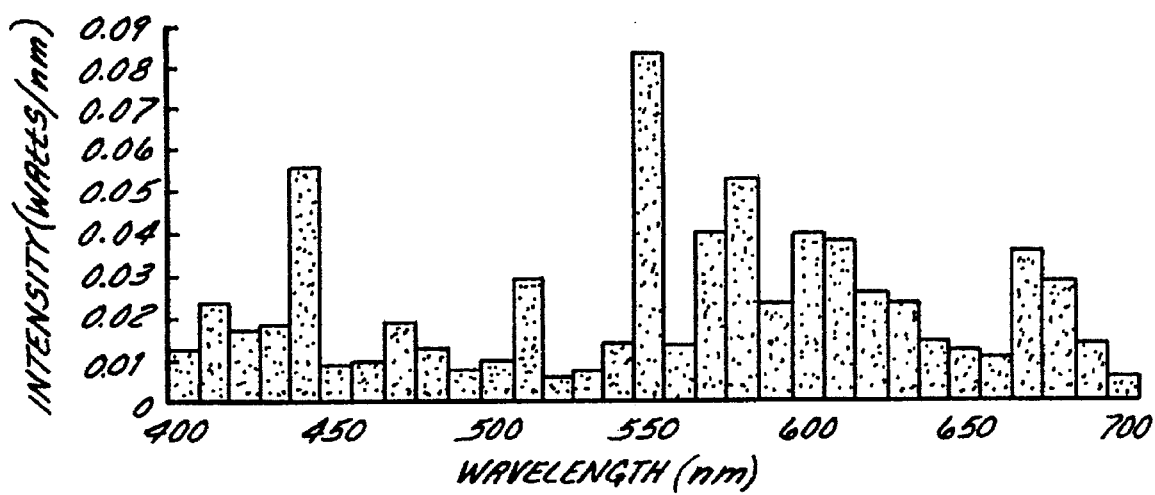
FIG. 28, illustrates a spectral distribution of energy generated in the visible range of the optical spectrum by an XMH-60 lamp.

Using an XMH-60 lamp as a light source and taking into account its spectral distribution, as shown in FIG. 28, it can be assumed that 34% of the power generated in the visible spectrum will be transmitted by the DT red filter.

Finally, for red light, the red all-around warning light system using an XMH-60 lamp will have an efficiency of $$\eta'_2=\eta_2.\eta'=0.27\times0.34=0.092, \quad (23)$$

where $\eta'=0.34$ is the efficiency of the color filter and light source combined. The minimum luminous flux required to be generated by the light source to provide the minimum required luminous flux in the red all-around warning light pattern is thus $$\Phi LSmin_2=\Phi min_2/\eta'_2=19.6/0.092=213 \text{ lumens.} \quad (24)$$

Currently used red all-round warning lights consist of two globes (one on each side of the mast). Each globe contain six 15-watt lamps (120 volts, 60 hertz). The total power is 180 watts. In the proposed universal remote lighting system only one tenth of the generated light (one tenth of the total XMH-60 lamp power of 60 watts) is needed. Comparing these numbers (6 watts versus 180 watts) shows that the efficiency of the universal remote lighting system is 30 times that of a conventional system.

A practical application of the present invention which has value within the technological arts is replacing conventional lighting systems with the present invention to reduce future maintenance costs. Further, all the disclosed embodiments are useful in conjunction with lighting systems such as are used for both military and commercial applications. Even though the present invention will not completely replace conventional electrical lighting in every application, it will be very advantageous in many special environments in which lighting using conventional electrical light transmission technology is impractical or uneconomical.

One example is specialty lighting applications, such as ship, aircraft, and boat-mast lighting, as well as refrigerator and building energy management lighting. The present invention will also be useful for internal lighting on military aircraft as a weight saving measure.

Another example is safety-related lighting applications, such as the Defense Explosive Safety Board requirement for the use of vapor-tight explosion-proof light fixtures in all facilities. Whenever a bulb requires replacement, all flammable materials (stored or work-in-process) must be removed from the room and the fixture cleaned with steam to remove explosive particles before bulb replacement. Rooms are typically small to reduce blast effect in case of fires. A system according to the present invention could provide an illumination source outside the room, thereby cutting the capital cost of fixtures and cutting maintenance costs and down time for illumination source replacement. This same rationale applies to makers of paint booths, which have safety imposed restrictions requiring vapor-tight light fixtures. Placing the illumination source outside the booth would eliminate the need to use the expensive fixtures.

Another example is traffic and road signage, where replacing bulbs is a major expense because the lighting is usually high overhead and in remote locations, driving maintenance labor costs very high compared to capital cost. A system according to the present invention could provide an illumination source conveniently placed at ground level, eliminating the need for cherrypickers and other expensive support equipment.

Another example is environmental control lighting, such as cold light in medical operating rooms, mine area lighting, refinery distillation area lighting, emergency lighting systems and underwater lighting. The removal of the hot illumination source from building, or other area, results in reduced air conditioning loads and more efficient energy use. Removal of hot lights from refrigerated cabinets, where water condensate freezes on luminaries, results in lower light levels and color change.

Other examples include high bay lighting in maintenance facilities, where bulb replacement is expensive due to the need for cherrypickers, and lighting in nuclear waste depositories. There are virtually innumerable uses for the present invention, all of which need not be detailed here.

The present invention described herein provides substantially improved results that are unexpected. All the disclosed embodiments can be practiced without undue experimentation. The entirety of everything cited above or below is hereby expressly incorporated by reference.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration, which separate the illuminator from the beamformer so as to provide a remote lighting system. Further, although the remote lighting system described herein is a physically separate module, it will be manifest that the remote lighting system may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

REFERENCES

1. Federal Aviation Administration, Specification FAA-E2689a, Dual Mode High Intensity Approach Lighting System (ALSF-2/SS ALR), September, 1983.
2. W. T. Welford and R. Winston, High Collection Nonimaging Optics, Academic Press, Inc., 1989.
3. Navigation Rules, U.S. Department of Transportation, U.S. Coast Guard, 1990.
4. Standard for Safety, Marine Navigation Lights, UL-1104, Underwriters Laboratories, Oct. 20, 1986.

What is claimed is:

1. A remote lighting system comprising:
   an illuminator including
      a light source; and
      an input coupler optically coupled to said light source;
   a first light pipe optically coupled to said input coupler; and
   a first beamformer connected to said first light pipe, said first beamformer including
      a first nonimaging total internal reflection light transformer optically coupled to said first light pipe; and
      a first holographic diffuser optically coupled to said first nonimaging total internal reflection light transformer,
   wherein light from said first nonimaging total internal reflection light transformer is transmitted through said first holographic diffuser.

2. The remote lighting system of claim 1, wherein said input coupler includes a coupler-splitter and further comprising
   a second light pipe optically coupled to said coupler-splitter; and a second beamformer connected to said second light pipe, said second beamformer including
    a second nonimaging total internal reflection light transformer optically coupled to said second light pipe; and
    a second holographic diffuser optically coupled to said second nonimaging total internal reflection light transformer,
wherein i) light from said second nonimaging total internal reflection light transformer is transmitted through said second holographic diffuser and shaped by said second holographic diffuser and ii) light from said first nonimaging total internal reflection light transformer that is transmitted through said first holographic diffuser is shaped by said first holographic diffuser.

3. The remote lighting system of claim 1, wherein said first beamformer includes a first luminair and a second luminair.

4. The remote lighting system of claim 1, wherein said first beamformer includes a color filter optically coupled to said first holographic diffuser.

5. The remote lighting system of claim 1, further comprising a direct optical regulator and an optical switch, wherein said input coupler is optically coupled to said light source through said optical switch and said direct optical regulator is connected to said optical switch.

6. The remote lighting system of claim 1, wherein said first nonimaging total internal reflection light transformer includes a compound parabolic concentrator.

7. A method of making the remote lighting system of claim 1 comprising:
    providing said illuminator with said input coupler optically coupled to said light source;
    providing said first light pipe;
    coupling said first light pipe to said input coupler;
    providing said first beamformer with said first holographic diffuser optically coupled to said first nonimaging total internal reflection light transformer; and
    connecting said first beamformer to said first light pipe, wherein said first nonimaging total internal reflection light transformer is made by electroforming a nonimaging optical element on a sacrificial mandrel; then trimming said nonimaging optical element to a length; and then dissolving said sacrificial mandrel.

8. A combination system comprising at least two of the remote lighting systems of claim 1.

9. Apparatus comprising:
    an illuminator including:
        a light source;
        an optical switch optically coupled to said light source, said optical switch including a solid state liquid crystal rotator;
        a direct optical regulator connected to said optical switch; and
        an input coupler optically coupled to said optical switch;
    a first light pipe optically coupled to said input coupler; and
    a first beamformer connected to said first light pipe, said first beamformer including:
        a first nonimaging total internal reflection light transformer optically coupled to said first light pipe; and
        a first holographic diffuser optically coupled to said first nonimaging total internal reflection light transformer,
    wherein light from said first nonimaging total internal reflection light transformer is transmitted through said first holographic diffuser.

10. An aircraft approach lighting system comprising:
    an illuminator including
        a light source; and
        an input coupler optically coupled to said light source;
    a first light pipe optically coupled to said input coupler; and
    a first beamformer connected to said first light pipe, said first beamformer including
        a first nonimaging total internal reflection light transformer optically coupled to said first light pipe; and
        a first holographic diffuser optically coupled to said first nonimaging total internal reflection light transformer,
    wherein light from said first nonimaging total internal reflection light transformer is transmitted through said first holographic diffuser.

11. The aircraft approach lighting system of claim 10, wherein said input coupler includes a coupler-splitter and further comprising
    a second light pipe optically coupled to said coupler-splitter; and
    a second beamformer connected to said second light pipe, said second beamformer including
        a second nonimaging total internal reflection light transformer optically coupled to said second light pipe; and
        a second holographic diffuser optically coupled to said second nonimaging total internal reflection light transformer,
    wherein i) light from said second nonimaging total internal reflection light transformer is transmitted through said second holographic diffuser and shaped by said second holographic diffuser and ii) light from said first nonimaging total internal reflection light transformer that is transmitted through said first holographic diffuser is shaped by said first holographic diffuser.

12. The aircraft approach lighting system of claim 10, wherein said first beamformer includes a first luminair and a second luminair.

13. The aircraft approach lighting system of claim 10, wherein said first beamformer includes a color filter optically coupled to said first holographic diffuser.

14. The aircraft approach lighting system of claim 10, further comprising a direct optical regulator and an optical switch, wherein said input coupler is optically coupled to said light source through said optical switch and said direct optical regulator is connected to said optical switch.

15. The aircraft approach lighting system of claim 10, wherein said first nonimaging total internal reflection light transformer includes a compound parabolic concentrator.

16. A method of making the aircraft approach lighting system of claim 10, comprising:
    providing said illuminator with said input coupler optically coupled to said light source;
    providing said first light pipe;
    coupling said first light pipe to said input coupler;
    providing said first beamformer with said first holographic diffuser optically coupled to said first nonimaging total internal reflection light transformer; and
    connecting said first beamformer to said first light pipe, wherein said first nonimaging total internal reflection light transformer is made by electroforming a nonimaging optical element on a sacrificial mandrel; then trimming said nonimaging optical element to a length; and then dissolving said sacrificial mandrel.

17. A combination system comprising at least two of the aircraft approach lighting systems of claim 10.

18. A navigation lighting system comprising:
an illuminator including
a light source; and
an input coupler optically coupled to said light source;
a first light pipe optically coupled to said input coupler; and
a first beamformer connected to said first light pipe, said first beamformer including
a first nonimaging total internal reflection light transformer optically coupled to said first light pipe; and
a first holographic diffuser optically coupled to said first nonimaging total internal reflection light transformer,
wherein light from said first nonimaging total internal reflection light transformer is transmitted through said first holographic diffuser.

19. A combination system comprising at least two of the navigation lighting systems of claim 18.

20. The navigation lighting system of claim 18, wherein said input coupler includes a coupler-splitter and further comprising
a second light pipe optically coupled to said coupler-splitter; and
a second beamformer connected to said second light pipe, said second beamformer including
a second nonimaging total internal reflection light transformer optically coupled to said second light pipe; and
a second holographic diffuser optically coupled to said second nonimaging total internal reflection light transformer,
wherein i) light from said second nonimaging total internal reflection light transformer is transmitted through said second holographic diffuser and shaped by said second holographic diffuser and ii) light from said first nonimaging total internal reflection light transformer that is transmitted through said first holographic diffuser is shaped by said first holographic diffuser.

21. The navigation lighting system of claim 18, wherein said first beamformer includes a first luminair and a second luminair.

22. The navigation lighting system of claim 18, wherein said first beamformer includes a color filter optically coupled to said first holographic diffuser.

23. The navigation lighting system of claim 18, further comprising a direct optical regulator and an optical switch, wherein said input coupler is optically coupled to said light source through said optical switch and said direct optical regulator is connected to said optical switch.

24. The navigation lighting system of claim 18, wherein said first nonimaging total internal reflection light transformer includes a compound parabolic concentrator.

25. A method of making the navigation lighting system of claim 18, comprising:
providing said illuminator with said input coupler optically coupled to said light source;
providing said first light pipe;
coupling said first light pipe to said input coupler;
providing said first beamformer with said first holographic diffuser optically coupled to said first nonimaging total internal reflection light transformer; and
connecting said first beamformer to said first light pipe,
wherein said first nonimaging total internal reflection light transformer is made by electroforming a nonimaging optical element on a sacrificial mandrel; then trimming said nonimaging optical element to a length; and then dissolving said sacrificial mandrel.

* * * * *